(12) United States Patent
Poulin

(10) Patent No.: US 8,376,907 B2
(45) Date of Patent: Feb. 19, 2013

(54) BRAKING SYSTEM AND METHOD FOR A VEHICLE

(75) Inventor: Pierre Poulin, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 772 days.

(21) Appl. No.: 12/476,771

(22) Filed: Jun. 2, 2009

(65) Prior Publication Data

US 2010/0304930 A1     Dec. 2, 2010

(51) Int. Cl.
*B60W 10/04* (2006.01)
(52) U.S. Cl. .......................................... 477/35
(58) Field of Classification Search .............. 192/220, 192/225; 188/58; 475/231, 249
See application file for complete search history.

(56) References Cited

U.S. PATENT DOCUMENTS

| | | | |
|---|---|---|---|
| 6,354,421 B1 | 3/2002 | Mochizuki et al. | |
| 6,883,630 B2 * | 4/2005 | Morin | 180/244 |
| 7,361,114 B2 * | 4/2008 | Boddy | 475/231 |
| 7,549,941 B2 * | 6/2009 | Boddy | 475/231 |
| 8,043,184 B2 * | 10/2011 | Boddy | 475/88 |
| 2002/0063010 A1 | 5/2002 | Morin | |

FOREIGN PATENT DOCUMENTS

DE    19846667 A1    4/2000
EP      0401095 A1    12/1990

OTHER PUBLICATIONS

International Search Report of PCT Application No. PCT/US2009/047175; Feb. 11, 2010; Gerard Vogt-Schilb.
English Abstract of EP0401095.
English Abstract of DE19846667.

* cited by examiner

*Primary Examiner* — David D Le
*Assistant Examiner* — David J Hlavka
(74) *Attorney, Agent, or Firm* — BCF LLP

(57) ABSTRACT

A vehicle comprises a plurality of wheels is supported by a frame. At least one of the plurality of wheels is operatively connected to an engine for propelling the vehicle. A limited slip differential is supported by the frame. A first half-shaft and a second half-shaft are operatively connected to the limited slip differential. The first half-shaft supports a first wheel of the plurality of wheels. The second half-shaft supports a second wheel of the plurality of wheels. A brake is operatively connected to the limited slip differential. The brake selectively exerts a braking torque on the first and second wheels via at least one portion of the limited slip differential to reduce the speed of the vehicle. A method of operating a vehicle is also described.

10 Claims, 18 Drawing Sheets

BRAKING SYSTEM AND METHOD FOR A VEHICLE

FIELD OF THE INVENTION

The present invention relates to a braking system and a method for braking a vehicle.

BACKGROUND OF THE INVENTION

Wheeled vehicles, such as cars, all-terrain vehicles (ATVs), three-wheeled vehicles and motorcycles, are generally equipped with one or more brakes for slowing or stopping the vehicle. The driver of the vehicle can actuate the brakes by actuating a pedal, lever, or other actuator that is positioned on the vehicle within his reach. One common type of brake, a disk brake, uses friction between a brake caliper and a brake disk to slow or stop the rotation of a wheel of the vehicle relative to the body of the vehicle. The resulting friction between the tire and the terrain exerts a braking force on the vehicle to slow the vehicle.

In general, it is desirable to be able to minimize the distance traveled by a moving vehicle before it stops. To this end, it is desirable to maximize the friction between each wheel and the terrain during braking. It is well known that the maximum available friction that can be generated by a tire when slipping with respect to terrain (kinetic friction) is lower than the maximum available friction that can be generated by the tire when rolling without slipping with respect to the terrain (static friction). Therefore, braking performance is improved on most types of terrain by increasing the braking torque on the wheels, up to the point where the braking force between the tire and the terrain is barely insufficient to cause slipping. One application of this principle is threshold braking, in which the driver modulates the brakes to provide as much braking torque as possible before the tires begin to slip. However, effective threshold braking depends on the skills and experience of the driver, and can be difficult to perform on some types of terrain. In addition, threshold braking does not allow the braking force at each wheel to be independently controlled, which may be desired when not all of the wheels are on the same type of terrain (e.g. some wheels on dry pavement and other wheels on ice), and some wheels may begin slipping before others achieve their maximum braking force.

One attempt to improve braking performance is with the use of an anti-lock braking system (ABS). A control unit detects differences in rotational speed between the wheels of the vehicle to determine whether one or more tires is slipping with respect to the terrain. If a particular tire is slipping, the control unit decreases the braking torque on the corresponding wheel in an attempt to restore static friction and maximize the braking force generated by the wheels. ABS essentially performs threshold braking individually for each wheel. As a result, each wheel independently rotates at the speed that provides the most braking force on its particular terrain, and therefore contributes as much as possible to the braking of the vehicle. An added benefit of ABS is that the car can be steered while braking, because the wheels do not lock and maintain some traction.

While ABS is now commonly used in cars, its cost is often prohibitive in relation to the price of an ATV. In addition, the components, in particular the brakes on each wheel, tend to both increase and decentralize the weight of an ATV, whereas minimizing weight is an important design consideration for ATVs. In addition, individual brakes constitute unsprung weight, which can decrease ride quality. In addition, ABS is limited in its applicability to two wheels joined by a solid axle or a locked differential, such as some ATVs, because the two wheels would not be permitted to rotate at different speeds when this would be desired in certain braking conditions.

In order to minimize and centralize vehicle weight, some ATVs are provided with a single rear disk brake, either on a portion of a solid rear axle, or on a driveshaft extending from the engine to a rear differential. An example of such an arrangement is described in U.S. Pat. No. 6,491,126, issued Dec. 10, 2002, which is incorporated by reference herein in its entirety.

Therefore, there is a need for a braking system for an ATV that allows for differential rotational speeds of the wheels to which it is applied.

There is also a need for a method of braking a vehicle that provides differential rotational speeds of the wheels to which it is applied.

SUMMARY OF THE INVENTION

It is an object of the present invention to ameliorate at least some of the inconveniences present in the prior art.

It is also an object of the present invention to provide a braking system wherein a single brake is applied to two wheels that are able to rotate at different speeds.

It is also an object of the present invention to provide a braking system having a single brake that applies a braking torque to two wheels via a limited slip differential.

It is also an object of the present invention to provide a braking system having a single brake that can simultaneously apply different braking torques to two wheels.

It is also an object of the present invention to provide a method of braking a vehicle whereby a single brake can simultaneously apply different braking torques to two wheels.

In one aspect, the invention provides a vehicle comprising a frame. A seat is disposed on the frame for supporting one or more riders. An engine is supported by the frame. A plurality of wheels is supported by the frame. At least one of the plurality of wheels is operatively connected to the engine for propelling the vehicle. A steering device is disposed generally forwardly of the seat and operatively connected to at least one of the plurality of wheels for steering the vehicle. A limited slip differential is supported by the frame. A first half-shaft and a second half-shaft are operatively connected to the limited slip differential. The first half-shaft supports a first wheel of the plurality of wheels. The second half-shaft supports a second wheel of the plurality of wheels. A brake is operatively connected to the limited slip differential. The brake selectively exerts a braking torque on the first and second wheels via at least one portion of the limited slip differential to reduce the speed of the vehicle.

In a further aspect, a shaft is operatively connected to the limited slip differential for providing an output torque of the engine to the limited slip differential. The brake is operatively connected to the limited slip differential via the shaft.

In a further aspect, the brake comprises a brake disk mounted on and rotating with the shaft. A brake caliper is supported by the frame and operative to selectively frictionally engage the brake disk to exert the braking torque.

In a further aspect, at least one portion of the brake is mounted on the at least one portion of the limited slip differential.

In a further aspect, a control unit is electrically connected to the limited slip differential. When the brake is actuated, the control unit is operative to selectively increase a degree of engagement of the limited slip differential in response to a difference between rotational speeds of the first and second wheels being greater than a first predetermined difference.

In a further aspect, selectively increasing the degree of engagement of the limited slip differential includes causing an actuator to increase a degree of engagement of a clutch of the limited slip differential. The clutch is disposed operatively between the at least one portion of the limited slip differential and one of the first and second half-shafts.

In a further aspect, the first predetermined difference is between 7 and 9 RPM.

In a further aspect, the shaft has a first portion and a second portion. The at least one portion of the brake is mounted on the first portion of the shaft. The second portion of the shaft is connected to the limited slip differential. A slip clutch operatively connects the first portion of the shaft to the second portion of the shaft, such that the slip clutch is operatively disposed between the brake and the at least one portion of the limited slip differential.

In a further aspect, the control unit is electrically connected to the slip clutch. When the brake is actuated, the control unit is operative to selectively decrease a degree of engagement of the slip clutch in response to at least one of the first and second wheels slipping with respect to terrain and the difference between the rotational speeds of the first and second wheels being less than a second predetermined difference. The second predetermined difference is less than the first predetermined difference.

In a further aspect, the second predetermined difference is less than 1 RPM.

In a further aspect, when the brake is actuated, the control unit is operative to selectively decrease a degree of engagement of the slip clutch in response to the rotational speeds of the first and second wheels being less than a predetermined threshold rotational speed and the difference between the rotational speeds of the first and second wheels being less than a second predetermined difference. The second predetermined difference is less than the first predetermined difference.

In an additional aspect, the invention provides a method of operating a vehicle. The vehicle comprises a first wheel and a second wheel. A limited slip differential is operatively connected to and disposed between the first wheel and the second wheel. A brake is operatively connected to the limited slip differential such that at least a portion of the limited slip differential is operatively disposed between the brake and each of the first and second wheels. The method comprises: determining whether the brake is actuated; determining a difference in rotational speed between the first wheel and the second wheel; when the brake is actuated, increasing a degree of engagement of the limited slip differential in response to the difference in rotational speed being greater than a first threshold; and reducing the speed of the vehicle.

In a further aspect, the method comprises determining whether the first and second wheels are slipping with respect to terrain. When the brake is actuated, the degree of engagement of the limited slip differential is decreased in response to both of the first and second wheels having traction with respect to the terrain and the difference in rotational speed being less than a second threshold. The second threshold is less than the first threshold.

In a further aspect, determining whether the first and second wheels have traction with respect to the terrain comprises comparing a speed of the vehicle to the rotational speeds of each of the first and second wheels.

In a further aspect, the vehicle comprises at least one third wheel. Determining whether the first and second wheels have traction with respect to the terrain comprises comparing a rotational speed of the at least one third wheel to the rotational speeds of the first and second wheels.

In a further aspect, the vehicle further comprises a shaft operatively connected to the limited slip differential for providing an output torque of an engine to the limited slip differential. Determining whether the first and second wheels have traction with respect to the terrain comprises comparing a rotational speed of the shaft to a rotational speed of at least one of the first and second wheels.

In a further aspect, the vehicle further comprises a slip clutch operatively disposed between the brake and the limited slip differential. When the brake is actuated, a degree of engagement of the slip clutch is decreased when at least one of the first and second wheels is slipping with respect to the terrain.

For the purposes of this application, the term "having traction", when used in connection with a wheel or tire, means that the wheel rolls without slipping with respect to terrain.

For the purposes of this application, the term "engagement", when used in connection with a clutch or a differential, refers to a state in which the two components coupled by the clutch or differential rotate at the same speed. Therefore, increasing the degree of engagement of a differential causes it to behave more like a locked differential by restricting the two components to either the same rotational speed or a smaller maximum difference in rotational speed. Similarly, decreasing the degree of engagement of a differential causes it to behave more like an open differential, by allowing a greater difference in rotational speed between the two components.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention is being described throughout this description as being used for the front wheels of an all-terrain vehicle, however it is contemplated that the invention could be used for the front wheels of an all-terrain vehicle, or for other wheeled vehicles such as three-wheeled vehicles.

Figure 1:
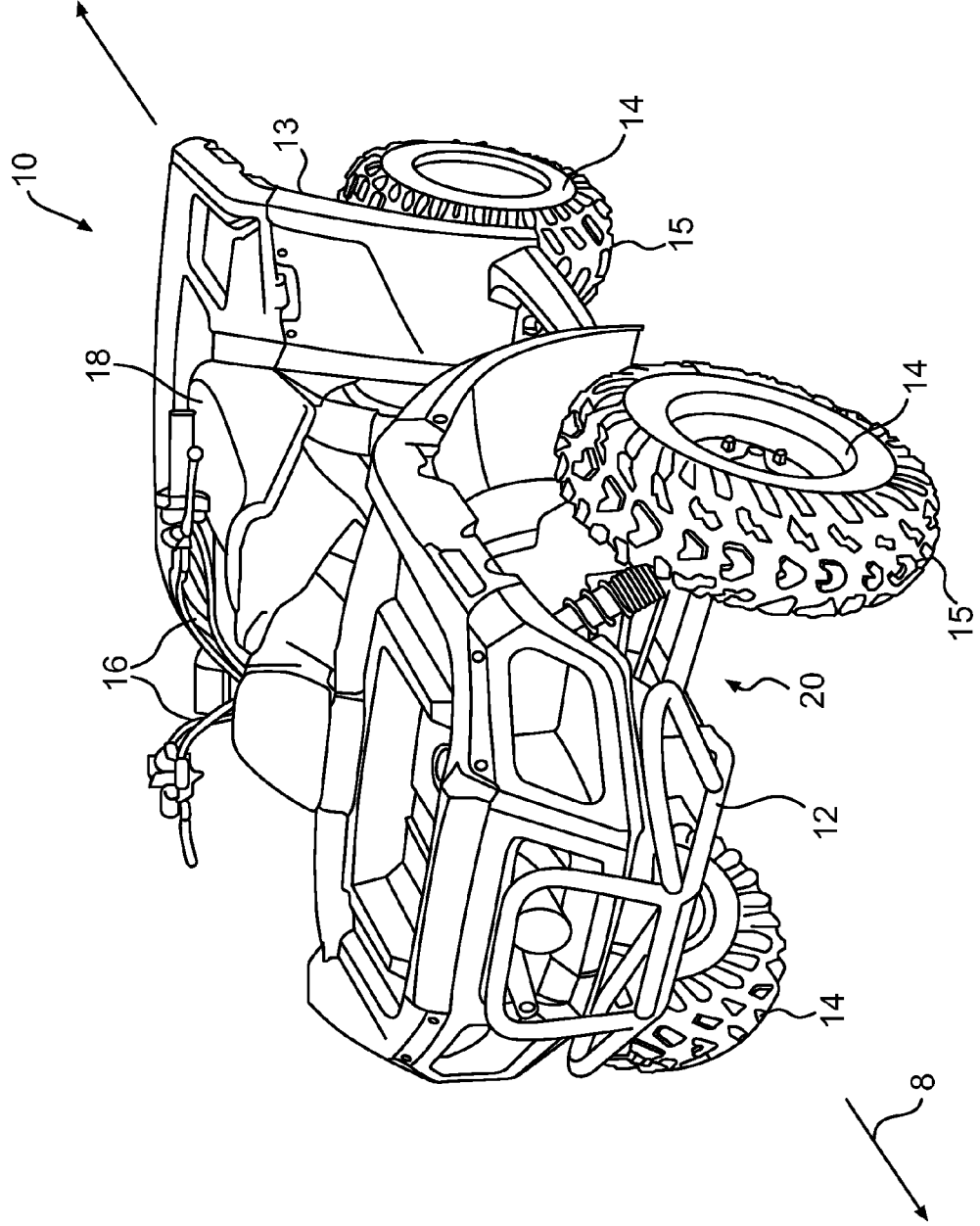
FIG. 1 is a perspective view, taken from a front left side, of an ATV.

FIG. 1 is a perspective view of an all-terrain vehicle (ATV), generally designated by reference numeral 10, incorporating a drivetrain 20 to which an embodiment of the present invention can be applied. The ATV 10 includes a frame 12 to which is mounted a body 13 and an internal combustion engine (not visible in FIG. 1) for powering the vehicle. Also connected to the frame 12 are four wheels 14 with low-pressure balloon tires 15 which are adapted for off-road conditions and traversing rugged terrain. The ATV 10 further includes a straddle seat 18 mounted to the frame 12 for supporting a driver and optionally one or more passengers. The ATV 10 has a center of gravity through which traverses a central longitudinal axis 8.

As shown in FIG. 1, two front wheels 14 are suspended from the frame 12 by respective front suspension assemblies (e.g. double A-arm suspension systems) while two rear wheels 14 are suspended from the frame by respective rear suspension assemblies (e.g., rigid swing arm suspension systems). The front and rear wheels 14 have 10 to 12 inch rims and are each disposed with a low-pressure balloon tire 15 that is mounted to a rim of each wheel and inflated to a pressure of no more than 2 kg/cm$^2$ (i.e., no more than 196 kPa or 28 psi).

Still referring to FIG. 1, the ATV 10 further includes a steering mechanism 16 which is rotationally supported by the frame 12 to enable a driver to steer the vehicle. The steering mechanism 16 includes a handlebar connected to a steering column (not shown) for actuating steering linkages connected to left and right front wheels 14.

As is known in the art, the ATV 10 is powered by an internal combustion engine having an engine casing 30, e.g. a 4-cycle single overhead cam engine whose cylinders are configured in a single or double V although, as will be readily appreciated by those of ordinary skill in the art, other types and configurations of engines can be substituted. The cylinders house reciprocating pistons 31 connected to a crankshaft 34, as is also well known in the art. The crankshaft 34 of the engine is coupled to a drivetrain 20 which delivers torque to the rear wheels 14, providing at least two-wheel-drive (2WD), and optionally also delivers torque to the front wheels 14 for four-wheel-drive (4WD) traction.

Figure 2:
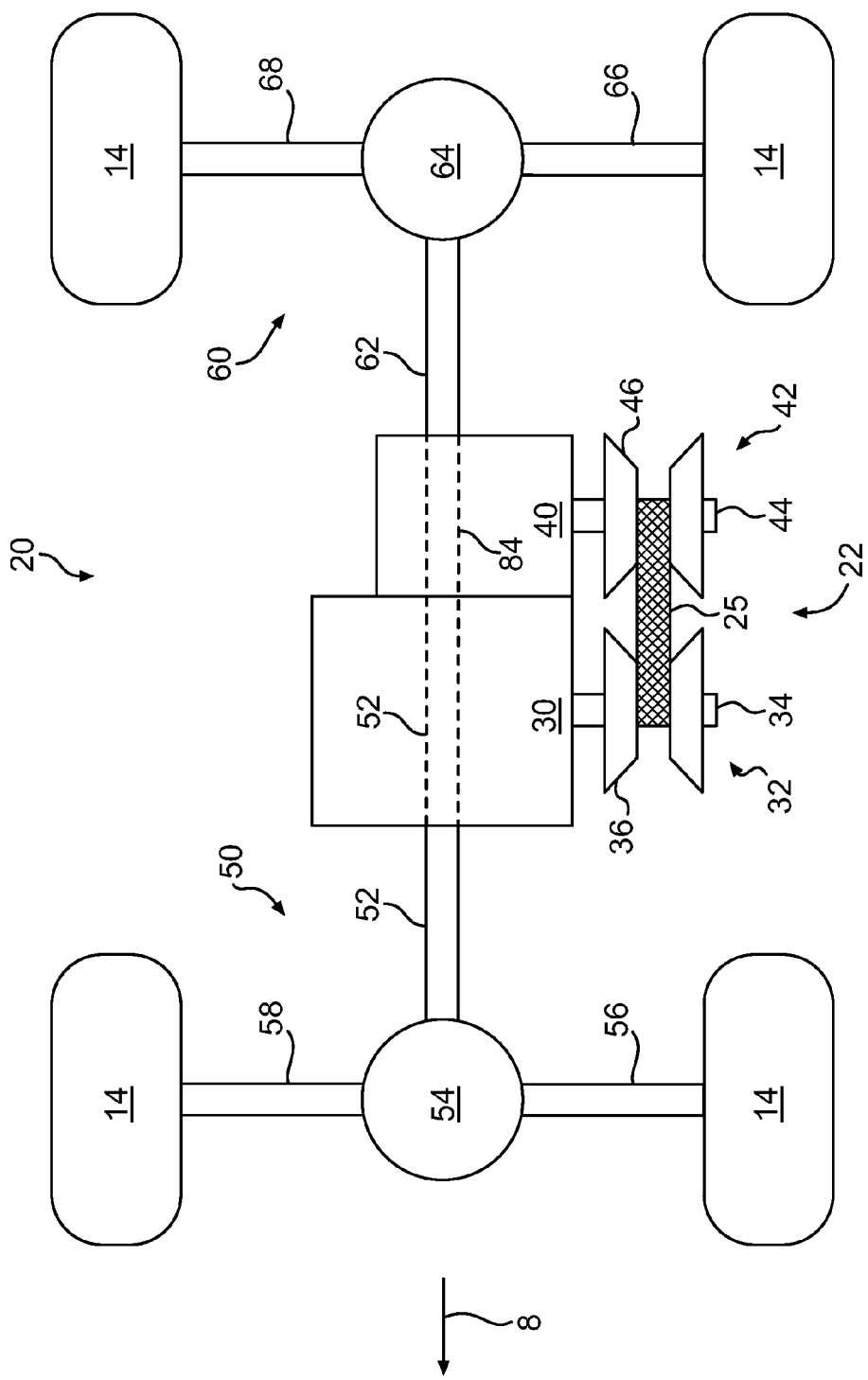
FIG. 2 is a schematic layout of a drivetrain of the ATV of FIG. 1.

FIG. 2 illustrates schematically the layout and power pack of the drivetrain 20 in accordance with an embodiment of the present invention. It should be understood that the present invention is applicable to alternative drivetrain configurations, and is not limited in application to the drivetrain 20 shown. As mentioned above, the drivetrain 20 is mechanically coupled to the internal combustion engine. In the illustrated embodiment, the drivetrain 20 includes a distinct transmission 40 that is detachably connected to a rear portion of the engine casing 30. The transmission 40 is preferably connected to the engine casing 30 with threaded fasteners 70, e.g. bolts, which facilitate assembly and disassembly of the transmission 40.

As shown in FIG. 2, the engine and transmission 40 are operatively connected by a continuously variable transmission (CVT) 22 having a belt 25 connecting an engine output 32 to a transmission input 42. The engine output 32 includes a crankshaft 34 connected to and driven by the pistons 31 in the cylinders of the internal combustion engine. Mounted to the crankshaft 34 is a drive pulley 36 which drives a corresponding driven pulley 46 via the belt 25. The driven pulley 46 is mounted to an input shaft 44 which delivers power to the transmission 40. The transmission 40 has a gearbox (not shown, but well known in the art) to reduce the angular velocity of the input shaft 44 in favor of greater torque.

As shown in FIG. 2, the transmission 40 operatively connects to both a front drive system 50 and a rear drive system 60. The front drive system 50 includes a front drive shaft 52 connected at a rearward end to the transmission 40 (i.e. to a forward end of an intermediary shaft 84 of the transmission 40) and at a forward end to a front limited-slip differential (LSD) 54. The operation of the LSD 54 will be discussed below in further detail. The front LSD 54 is connected to a left front half-shaft 56 and a right front half-shaft 58 which are, in turn, connected to the front wheels 14. Likewise, the rear drive system 60 includes a rear drive shaft 62 connected at a forward end to the transmission 40 (i.e. to a rearward end of the intermediary shaft 84 of the transmission 40) and at a rearward end to a rear differential 64. The differential 64 connects to a left rear half-shaft 66 and a right rear half-shaft 68 which are, in turn, connected to the rear wheels 14. Therefore, the drivetrain 20 allows the driver to select either two-wheel-drive (2WD) traction (i.e. power delivered only to the rear drive shaft) or four-wheel-drive (4WD) traction (i.e. power delivered to both the front and rear drive shafts). It is contemplated that drive chains could be used in place of one or both of the drive shafts 52, 62.

In order to enable the driver to select between 2WD and 4WD modes, the transmission 40 may optionally include a 2WD-4WD selector capable of selectively engaging or disengaging a front-to-rear drive shaft coupling. This enables a driver to switch between 2WD and 4WD. The transmission 40 can also include a transmission selector to enable a driver to select one of a plurality of drive modes for the vehicle, the drive modes including park, neutral, reverse and drive. In one embodiment, the drive modes further include high-speed drive and low-speed drive. As will be appreciated by those of ordinary skill in the art, the transmission selector can enable selection of other drive modes, e.g. three or more forward drive speeds. The transmission selector is itself connected to a shifter (not shown) that is readily accessible by the driver thereby enabling the driver to actuate the transmission selector while seated in the driver seat.

Figure 3:
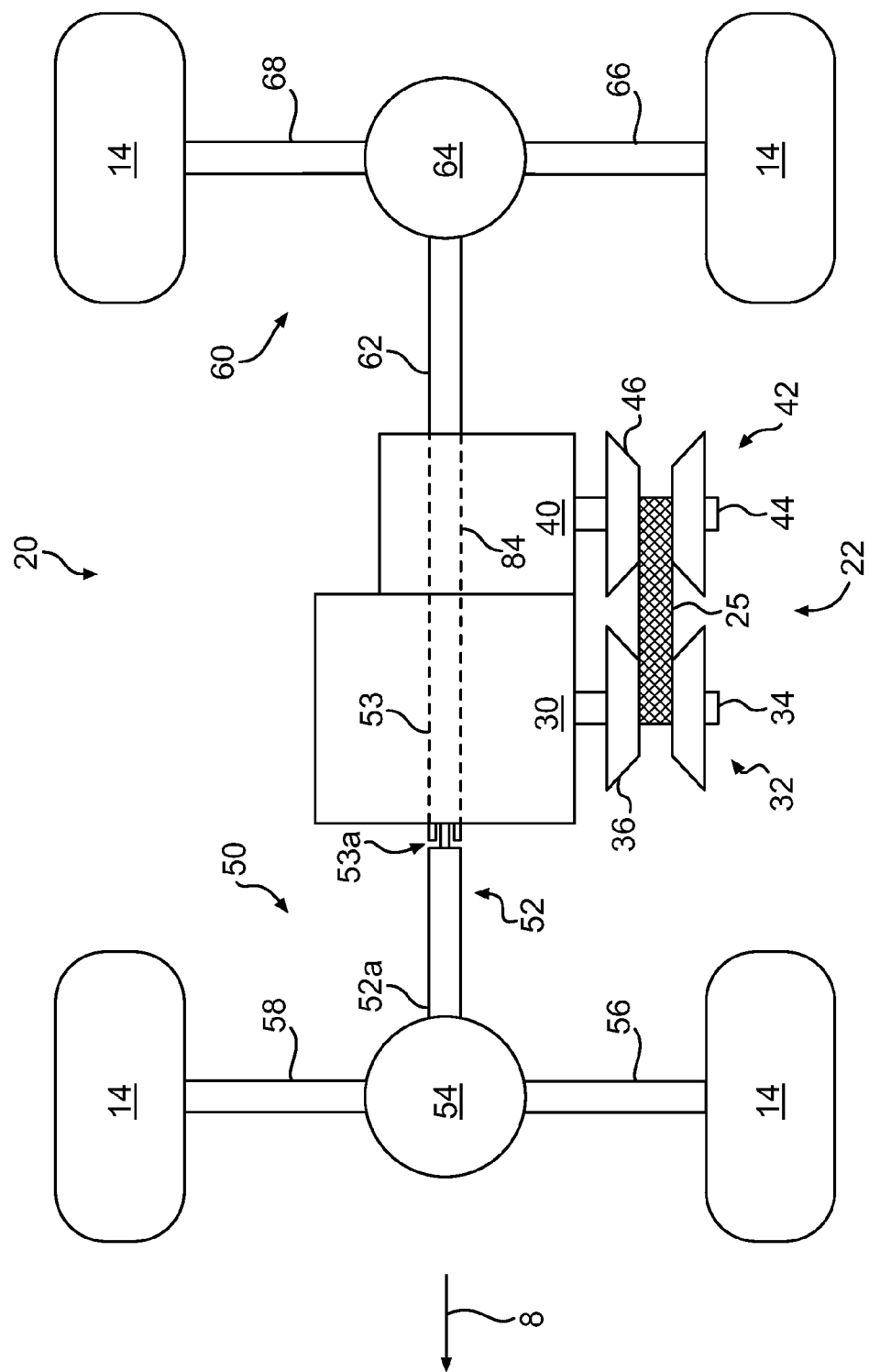
FIG. 3 is a schematic layout of an alternative drivetrain of the ATV of FIG. 1.

FIG. 3 shows the layout and power pack of an alternative drivetrain 20 in which the front drive shaft 52 is an articulated drive shaft having two subshafts 52a, 53 connected by a universal joint 53a. As shown in FIG. 3, a first subshaft 53 connects at a rearward end to the forward end of the intermediary shaft 84 and connects at a forward end to the rearward end of a second subshaft 52a via the universal joint 53a. Accordingly, the first subshaft 53 runs through the engine casing 30 while the second subshaft 52a runs from the universal joint 53a protruding from the engine casing 30 and terminates at the front differential 54. As will be appreciated by those of ordinary skill in the art, the drivetrain 20 could be modified to include additional subshafts.

Figure 4:
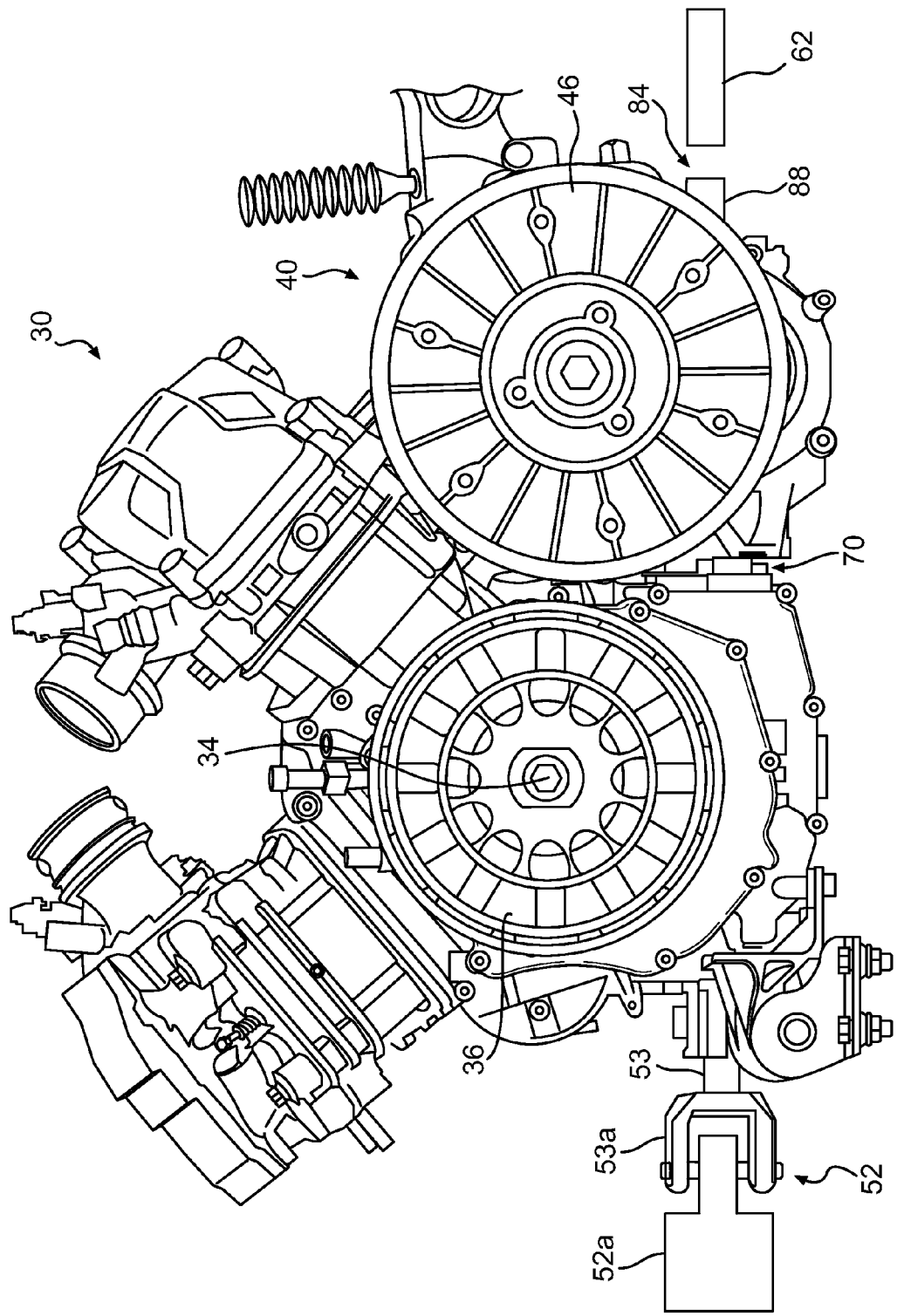
FIG. 4 is a side elevation view of an engine and transmission of the drivetrain of FIG. 3.

FIG. 4 is a side elevation view of the transmission 40 detachably connected by fasteners 70 to a rear face of the engine casing 30. The engine and transmission 40 are operatively connected by a belt-driven CVT 22 which couples the drive pulley 36 on the crankshaft 34 to the driven pulley 46 on the input shaft 44 of the transmission 40. The drive pulley 36 and the driven pulley 46 permit a continuously variable transmission ratio by virtue of the opening or closing of opposed conical side faces of one or more of the pulleys, as is known in the art. It should be understood that alternative configurations of the transmission 40 may be used.

As shown in FIG. 4, an intermediary shaft 84 has a splined rearward end 88 that protrudes from the rear of the transmission 40 to mesh with complementary splines on a front end of the rear drive shaft 62.

As further illustrated in FIG. 4, the first subshaft 53 of the front drive shaft 52 passes through the engine casing 30 and protrudes from a forward face of the engine casing 30 to terminate in a universal joint 53a. The universal joint 53a rotationally connects the first subshaft 53 and the second subshaft 52a of the front drive shaft 52. In another embodiment, a single front drive shaft 52 passes through the engine casing 30 to deliver torque from the transmission 40 to the front differential 54 and to the front wheels 14. As shown in FIG. 4, the front drive shaft 52 (or the first subshaft 53 in the preferred embodiment) passes through a bottom portion of the engine casing 30, beneath the crankshaft 34 and above the oil pan 37, as will be described and illustrated below.

Figure 5:
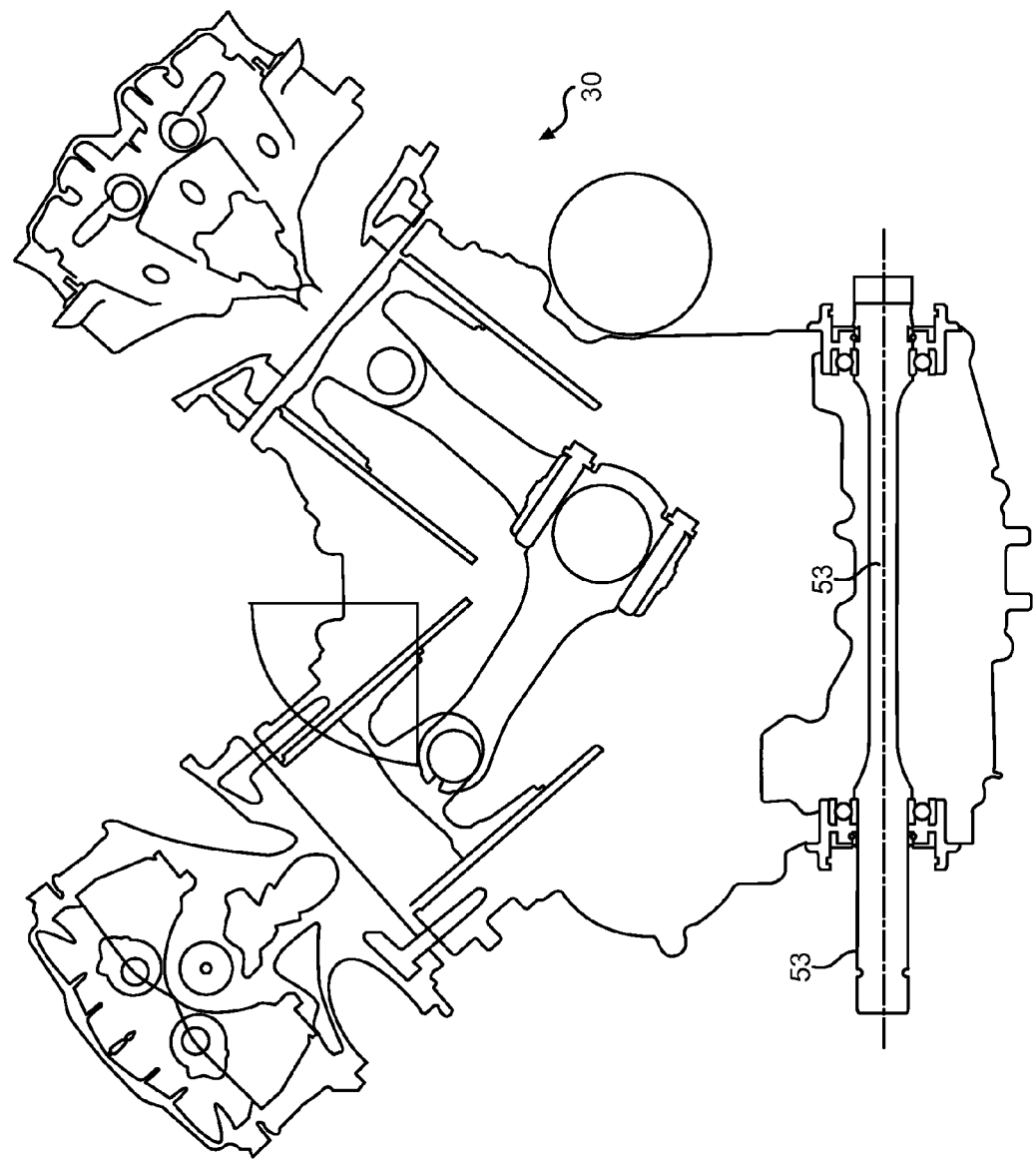
FIG. 5 is a cross-sectional view of the engine of FIG. 4 taken vertically through the front drive shaft traversing the engine casing.
Figure 6:
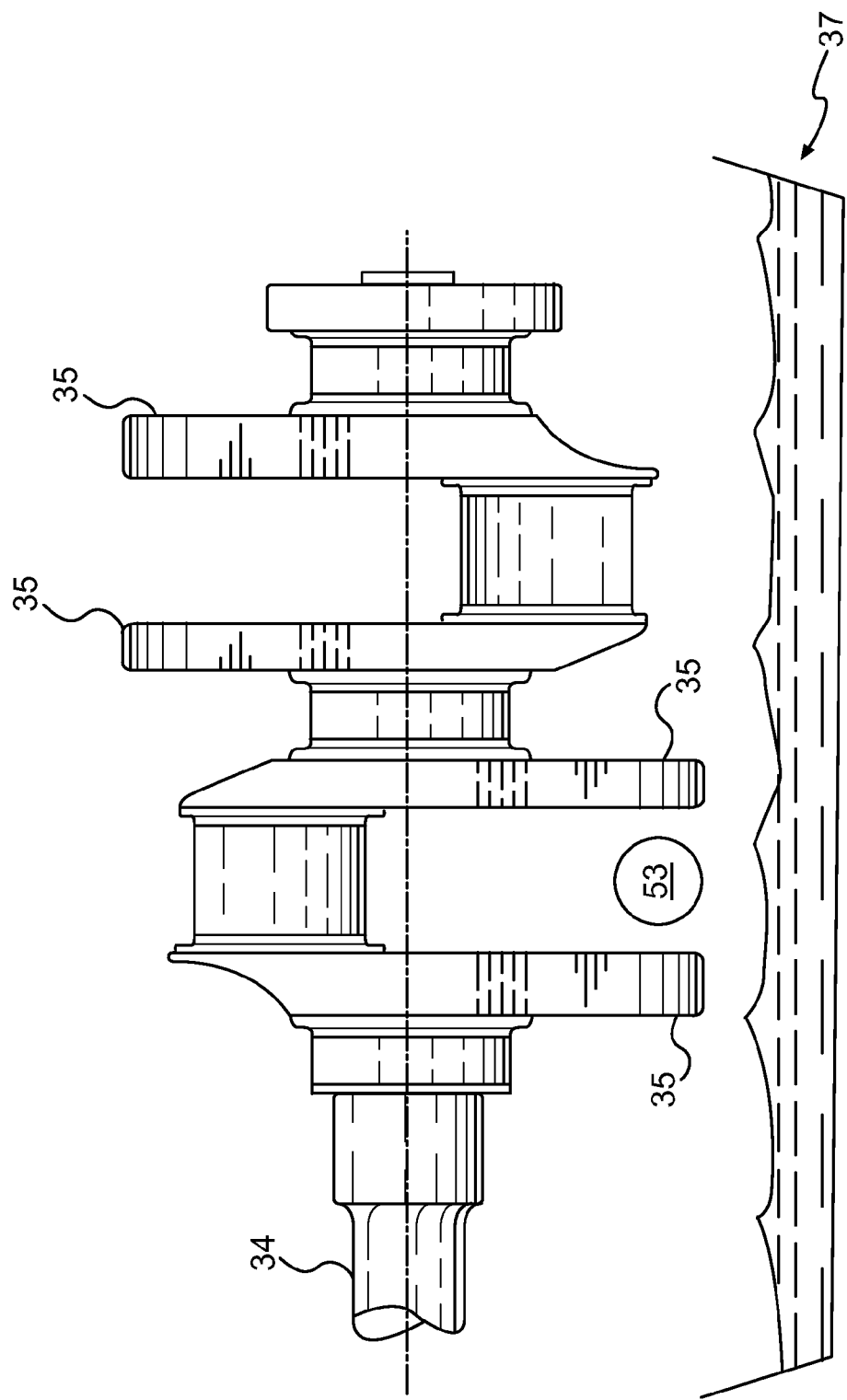
FIG. 6 is a partial cross-sectional view of the engine of FIG. 4 showing the front drive shaft passing above the oil pan of the engine and between the counterweights of the crankshaft.

FIG. 5 is a cross-sectional view of the first subshaft 53 of the front drive shaft 52 passing through the engine casing 30. The first subshaft 53 of the front drive shaft 52 passes through the bottom portion of the engine casing 30. As shown in FIG. 6, the first subshaft 53 preferably passes through the engine casing 30 beneath the crankshaft 34 but above an oil pan 37. Preferably, the front drive shaft 52 (or first subshaft 53) should not contact the oil contained in the oil pan 37. The drive shaft 52 can also be made to pass beneath the oil pan 37 rather than above the oil level in the oil pan 37. In either design, the drive shaft 52 does not contact the oil.

As illustrated in FIG. 6, the first subshaft 53 passes between adjacent counterweights 35. As will be appreciated by those of ordinary skill in the art, sufficient clearance must be provided between the first subshaft 53 and the crankshaft 34 so that when the piston bottoms out, the crankshaft 34 does not interfere with the first subshaft 53. Alternatively, where packaging and weight distribution are not hindered, the first subshaft 53 can be made to pass beside the counterweights 35 rather than passing between a pair of adjacent counterweights 35.

Figure 7:
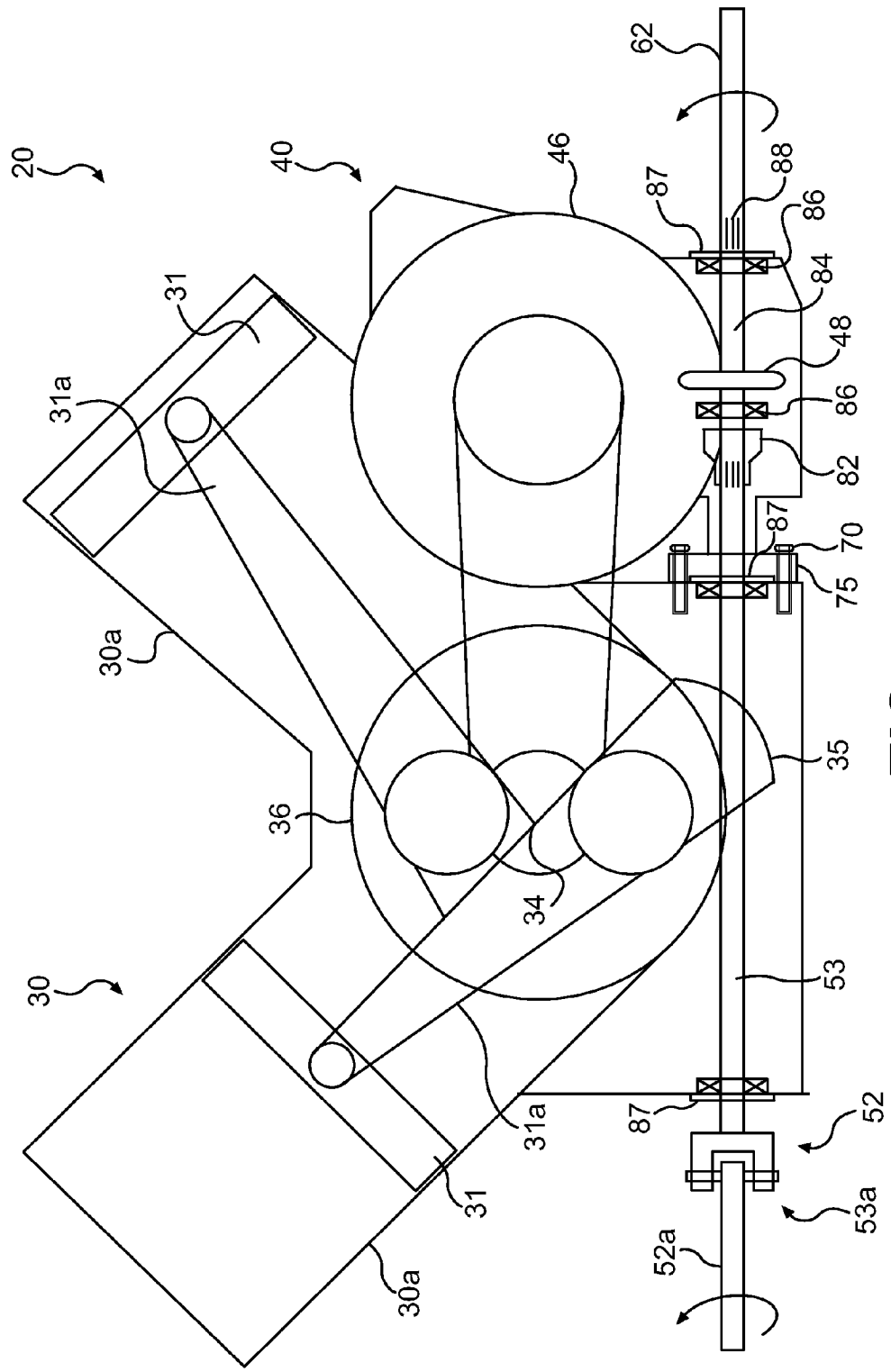
FIG. 7 is a schematic side view of the drivetrain of FIG. 3.

FIG. 7 is a schematic side view of the drivetrain 20. As shown in FIG. 7, a V-type engine, having an engine casing 30, has a pair of cylinders 30a. Each cylinder 30a has a reciprocating piston 31 connected to a connecting rod (or piston rod) 31a for turning respective cranks on the common crankshaft 34 as is well known in the art of internal combustion engines. The crankshaft 34 has two pairs of downwardly depending counterweights 35 (as was better illustrated in FIG. 6).

Finally, as mentioned above, the drive pulley 36 is mounted to the crankshaft 34 for driving the driven pulley 46 via the belt-driven CVT 22.

As shown in FIG. 7, the transmission 40 is fastened to a rear lower portion of the engine casing 30 using a plurality of threaded fasteners 70, e.g. bolts or screws, which facilitate assembly and disassembly, i.e. expedites the attaching and detaching of the transmission 40 to and from the engine casing 30. By detachably connecting the transmission 40 to the rear of the engine casing 30, the center of gravity of the drivetrain 20 is lowered while also optimizing mass centralization.

As illustrated in FIG. 7, the transmission 40 has a forward-facing mounting flange 75 for engaging a rear surface of the engine casing 30. The mounting flange 75 includes a plurality of circumferentially spaced holes through which the threaded fasteners 70 are inserted. The engine casing 30 has a plurality of circumferentially spaced bores corresponding to the holes in the mounting flange 75. The bores in the engine casing 30 are drilled and tapped with threads corresponding to the threads of the fasteners 70. It should be noted that a further design consideration is to provide sufficient clearance between the engine casing 30 and the transmission 40 to access all of the fasteners with a wrench or other such tool. Optionally, washers may be provided to minimize localized stress where the fasteners 70 are tightened to a very high torque, as is known in the art. Also, as known in the art, a thread-locker such as Loctite™ may applied to further secure the threaded connections so as to prevent loosening of the threaded connections due to engine vibration.

Figure 8:
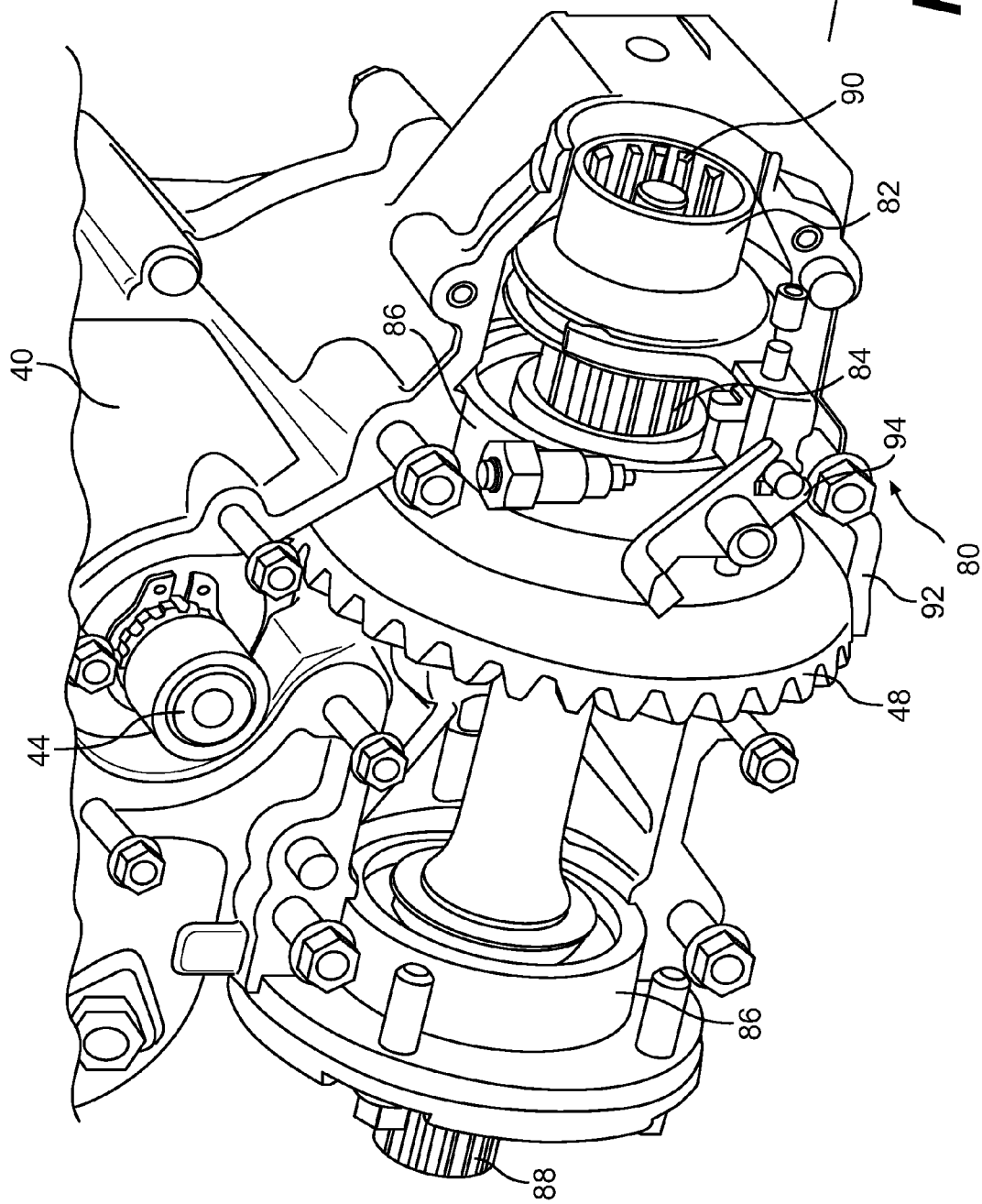
FIG. 8 is a perspective view of a bottom portion of a transmission of the ATV of FIG. 1, showing a 2WD-4WD selector mechanism for selectively coupling the transmission to the front drive shaft in addition to the rear drive shaft.

As further illustrated in FIGS. 7 and 8, the transmission 40 includes a reduction gear 48 securely mounted to the intermediary shaft 84. The intermediary shaft 84 is supported by and runs on a plurality of bearings 86 housed in bearing mounts. The rearward end of the intermediary shaft 84 has splines 88 to mesh with complementary splines in the rear drive shaft 62.

The forward end of the intermediary shaft 84 also has splines which selectively mesh with a 2WD-4WD selector coupling, e.g. a splined sleeve 82 which is axially actuated to couple power to the first subshaft 53. The first subshaft 53 preferably passes through a bore in the mounting flange 75. The first subshaft 53 passes through the engine casing 30, passing between the counterweights 35. The first subshaft 53 terminates in the universal joint 53a for connecting to the second subshaft 52a.

As further illustrated in FIG. 7, the engine and transmission 40 include annular grooves for receiving annular seals 87 for sealing the engine casing 30 and transmission 40 at the interfaces where the first subshaft 53 passes in order to prevent oil from leaking out of the engine casing 30 or transmission 40.

FIG. 8 shows a 2WD-4WD selector mechanism 80 which selectively axially displaces the splined sleeve 82 into meshed engagement with the splined intermediary shaft 84 to couple the front and rear drive shafts 52, 62. The sleeve 82 is displaced by pivoting a lever arm 92 about a pivot 94.

Figure 9:
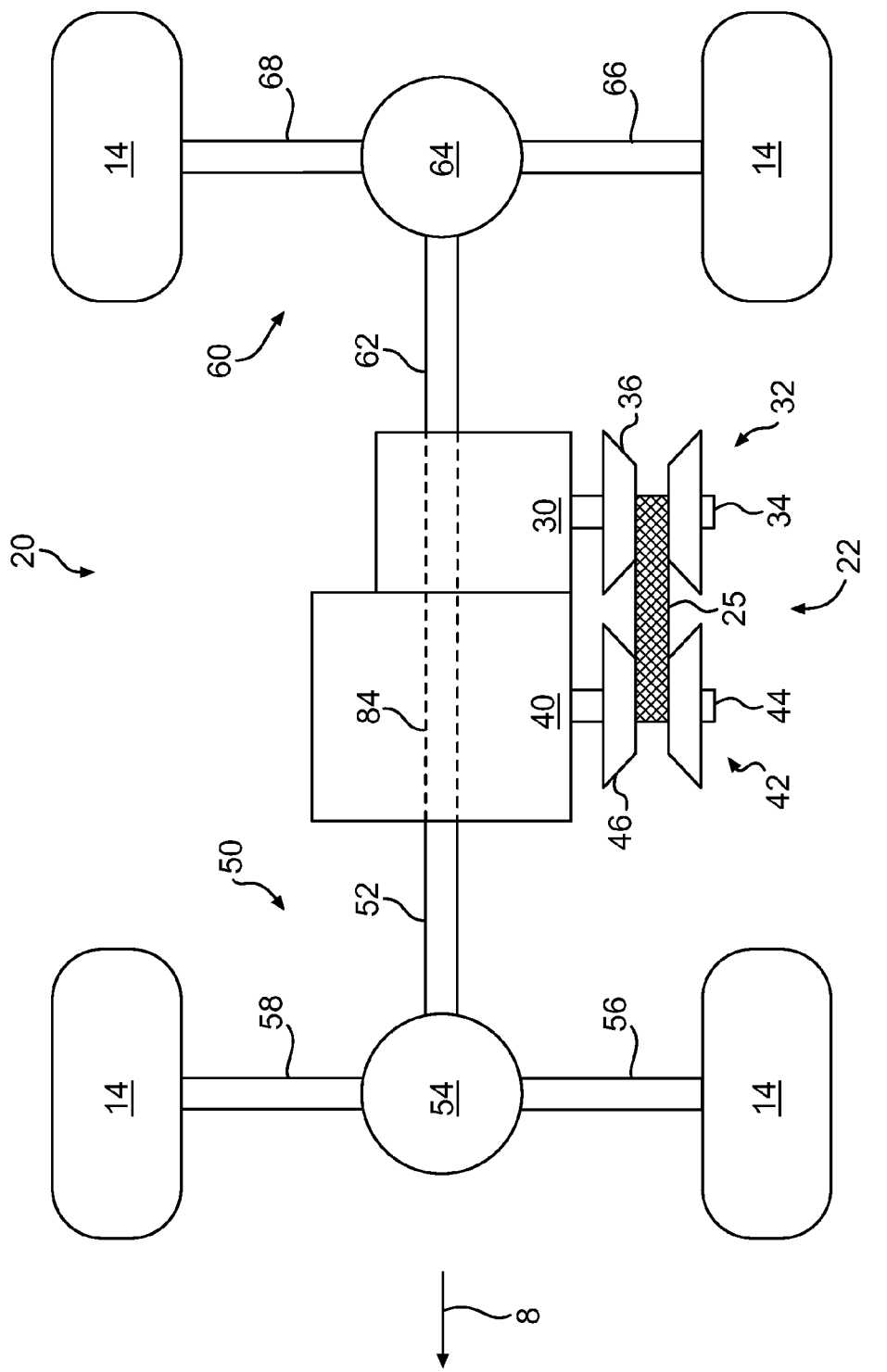
FIG. 9 is schematic layout of an alternative drivetrain of the ATV of FIG. 1, in which the transmission is disposed forward of the engine casing.

FIG. 9 is a schematic layout showing another embodiment in which the transmission 40 is disposed forward of the engine casing 30 (instead of rearward as in the preceding embodiments). For example, the transmission 40 may be disposed forward of the engine casing 30 for reasons of packaging or weight distribution. As shown in FIG. 9, the transmission 40 drives an intermediary shaft 84 which is coupled to both a front drive shaft 52 and a rear drive shaft 62. In this embodiment, the rear drive shaft 62 passes through the engine casing 30 to deliver torque to the LSD 64. Preferably, the transmission 40 is mounted to the forward face of the engine casing 30. More preferably, the transmission 40 is fastened in the manner already described with respect to the rear-mounted embodiments.

Figure 10:
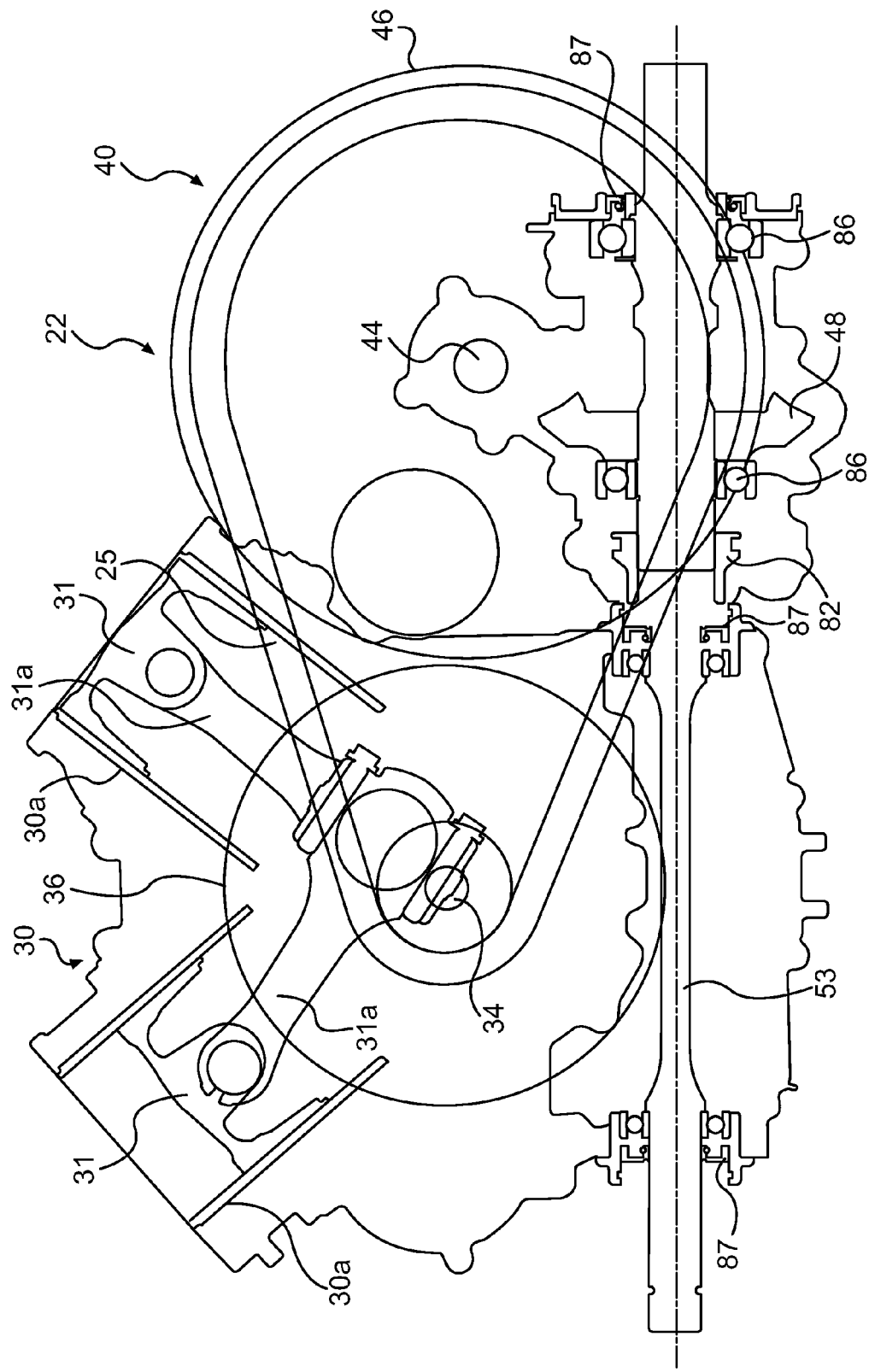
FIG. 10 is a cross-sectional view of an alternative drivetrain of the ATV of FIG. 1.

FIG. 10 is a schematic side view of the drivetrain in accordance with another embodiment of the present invention. This embodiment is similar to the embodiment shown in FIG. 7, but differs from it in that the diameter of the driven pulley 46 of the CVT 22 is larger than the diameter of the drive pulley 36. Thus, the transmission ratio between the drive pulley 36 and the driven pulley 46 is different than in the embodiment of FIG. 7, which results in a different vehicle performance.

Referring to FIGS. 11 to 15, braking systems for the front wheels 14 of the ATV 10 will be described according to several embodiments. Similar components of the braking systems that are shown in multiple embodiments are given similar numbers with different first digits. Some components that are similar or common to more than one embodiment will not be described in detail with respect to every embodiment.

Figure 11:
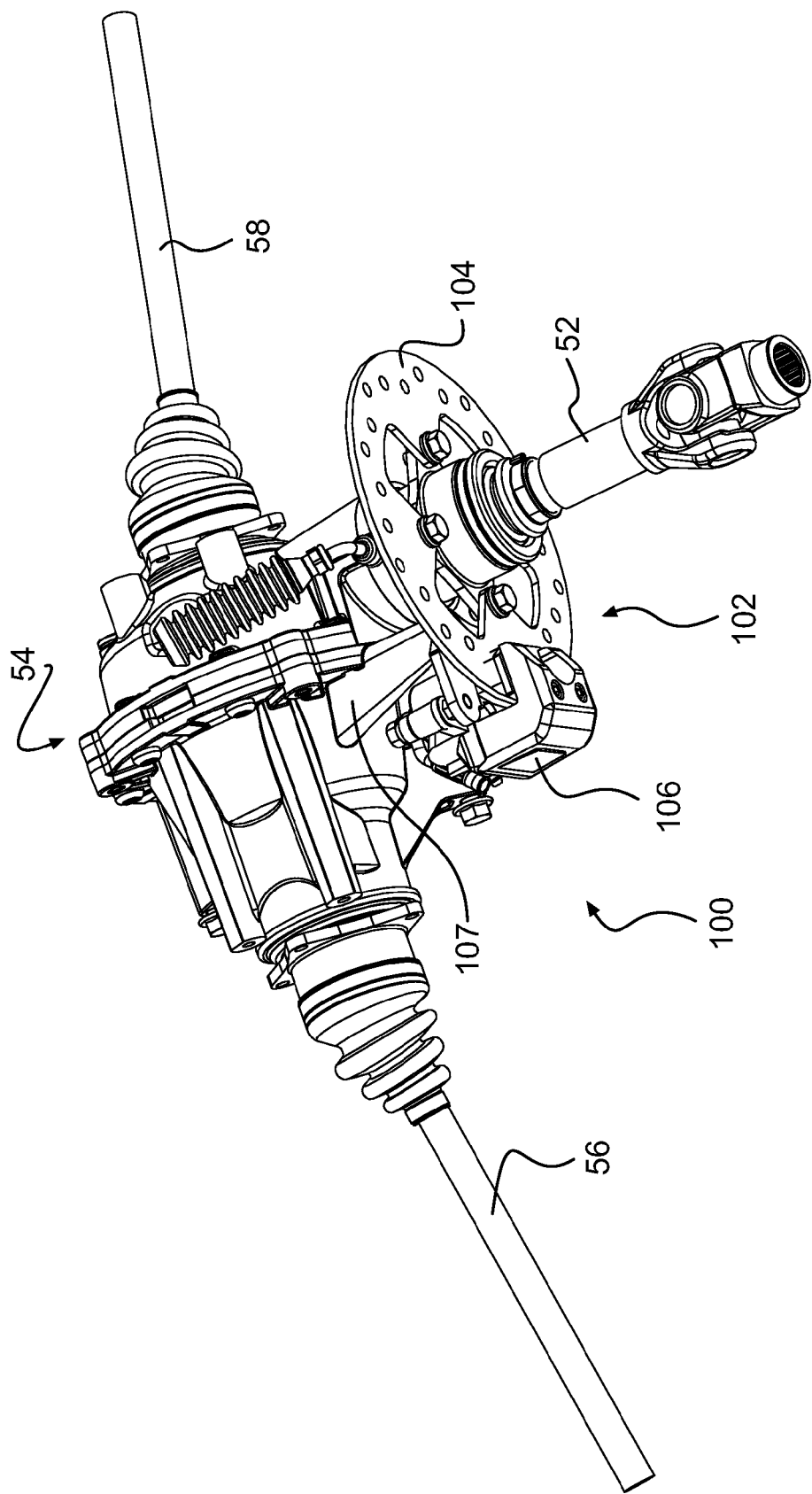
FIG. 11 is a perspective view, taken from a rear left, side, of a braking system according to a first embodiment.
Figure 12:
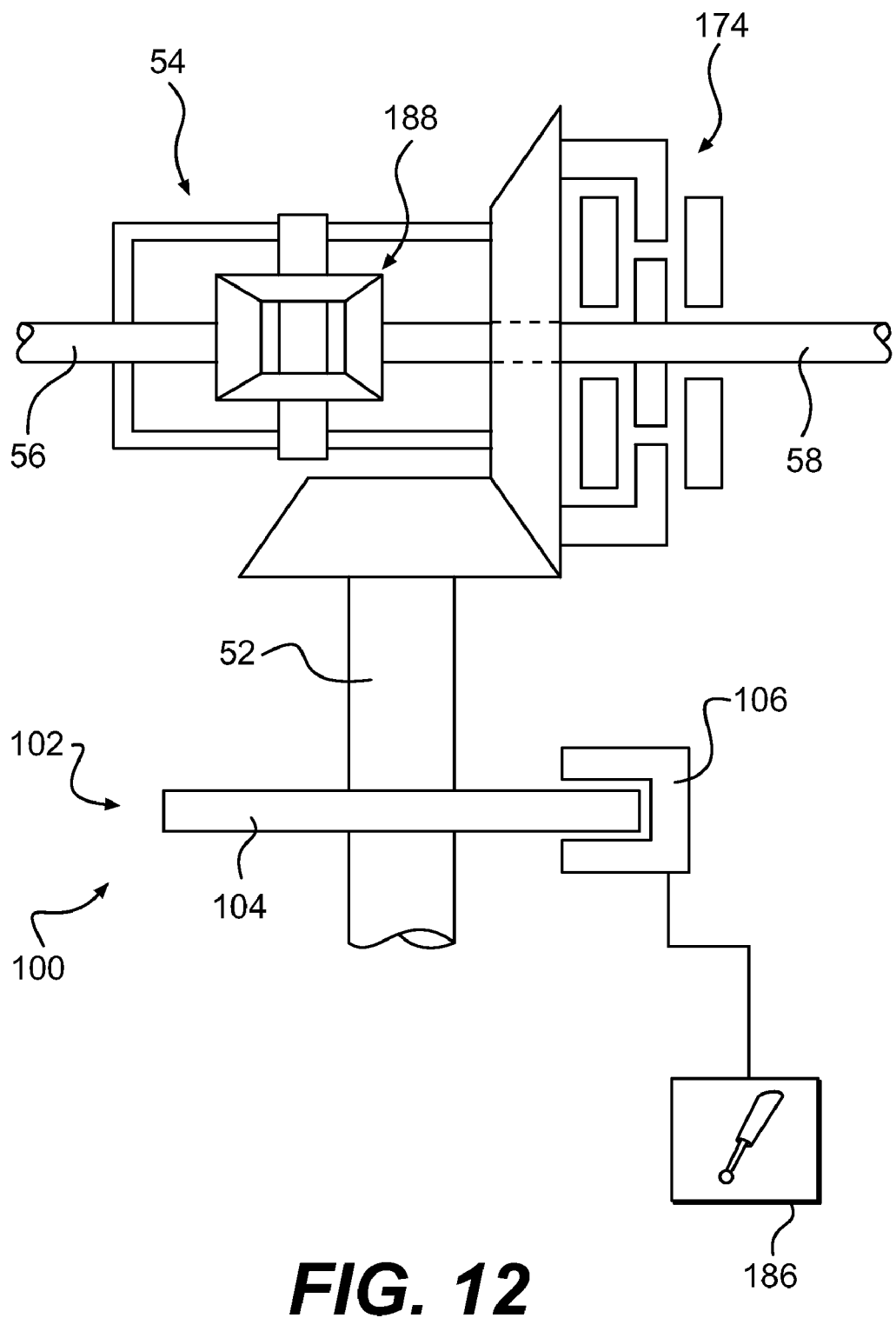
FIG. 12 is a schematic cross-sectional view of the braking system of FIG. 11.

FIGS. 11 and 12 show a braking system 100 for the front wheels 14 (best seen in FIG. 9) of the ATV 10 according to a first embodiment. It should be understood that the braking system 100 could alternatively be applied to the rear wheels 14 of the ATV 10, or to any pair of wheels of any other type of vehicle. A brake 102 comprises a brake disk 104 mounted on the front drive shaft 52, between the transmission 40 and the LSD 54. A brake caliper 106, mounted to the frame 12 via the flange 107 of the LSD 54 housing, selectively frictionally engages the disk 104 in a known manner when a driver actuates a brake actuator 186 of the ATV 10. The frictional engagement between the caliper 106 and the disk 104 slows the rotation of the front drive shaft 52, which exerts a braking torque on the front wheels 14 via the LSD 54 and the respective front half-shafts 56, 58. The LSD 54 is a conventional clutch-type limited slip differential, and is calibrated to allow a predetermined maximum difference in rotational speed between the left and right front wheels 14, the difference preferably being between 7 and 9 RPM. It is contemplated that any other suitable type of LSD 54 may alternatively be used. It is further contemplated that a mechanical or electronic slip clutch (not shown), similar to the slip clutch 384 of FIG. 14, may optionally be provided on the front drive shaft 52. In this manner, it should be understood that a single brake 102 can apply a braking torque to both front wheels 14 via the front drive shaft 52 and the LSD 54. As will be described below in greater detail, the LSD 54 can be used in conjunction with the single brake 102 to distribute braking torque between the left and right front wheels 14 based on the current traction of each wheel, thereby improving the braking performance of the ATV 10. In this manner, some of the benefits of a conventional anti-lock braking system can be obtained with the use of fewer components and at lower cost than a conventional anti-lock braking system with an individual brake for each front wheel 14. In addition, the single brake 102 and the other components of the braking system 100 can be positioned close to the central longitudinal axis 8 of the ATV 10. As a result, the mass of the ATV 10 can be centralized, and both the total mass and the unsprung mass of the ATV 10 can be reduced. The operation of the braking system 100 to brake the ATV 10 will be described in detail below.

Figure 13:
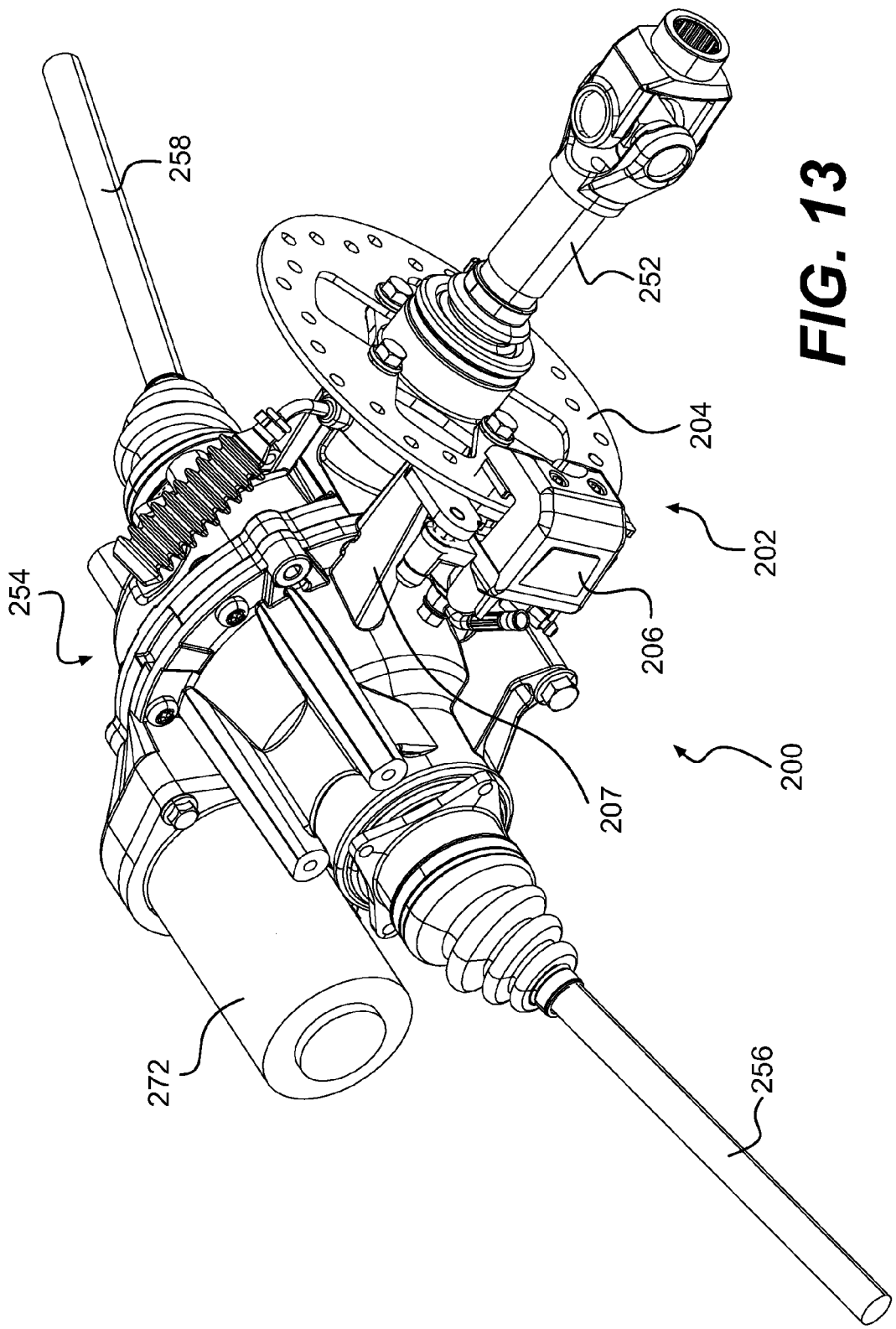
FIG. 13 is a perspective view, taken from a rear, left side, of a braking system according to a second embodiment.
Figure 14:
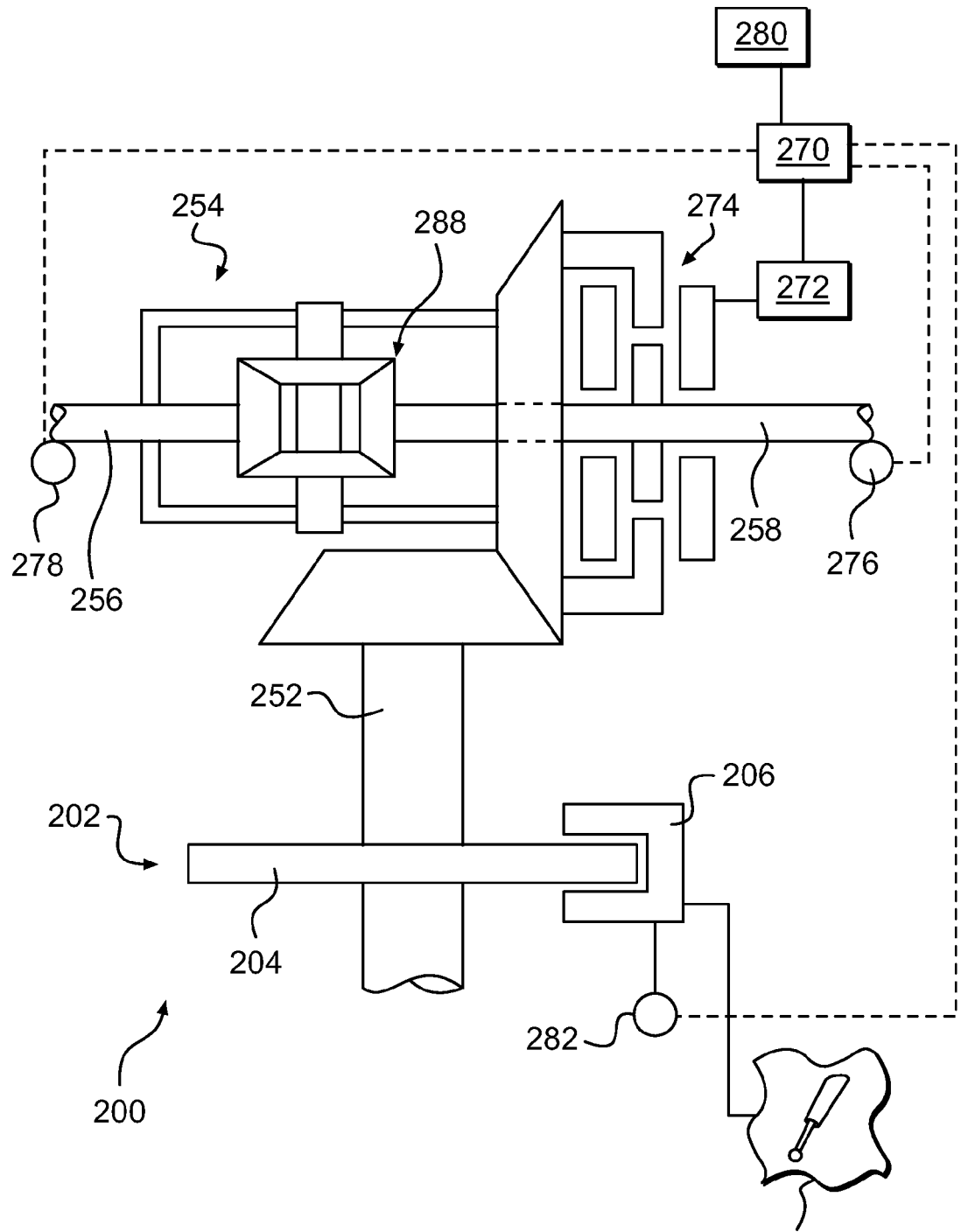
FIG. 14 is a schematic cross-sectional view of the braking system of FIG. 13.

FIGS. 13 and 14 show a braking system 200 for the front wheels 14 according to a second embodiment. The braking system 200 is similar to the braking system 100 of FIGS. 11 and 12, with the exception that the LSD 254 is an electronically controlled LSD. A control unit 270 is electrically connected to an actuator 272 that can vary the degree of engagement of the clutch 274 in the LSD 254, and thereby regulate the difference in rotational speed between the left and right front wheels 14. The control unit 270 may cause the LSD 254 to act as an open differential (fully disengaged), a locked differential (fully engaged), or any intermediate degree of engagement. The control unit 270 is electrically connected to wheel speed sensors 276, 278, which may be connected to the wheels 14, the front half-shafts 56, 58, or any other suitable component, from which the control unit 270 receives signals indicative of the speed of rotation of the front wheels 14. The control unit 270 is additionally electrically connected to a vehicle speed sensor 280, from which the control unit 270 receives signals indicative of the speed of travel of the ATV 10. The control unit 270 is additionally electrically connected to a brake sensor 282, which is connected to the brake actuator of the ATV 10 or a part of the braking system 200, from which the control unit 270 receives signals indicative of whether the brake actuator 286 has been actuated. The brake 202 may be either mechanically operated or controlled by the control unit 270. The operation of the braking system 200 to brake the ATV 10 will be described in detail below.

Figure 15:
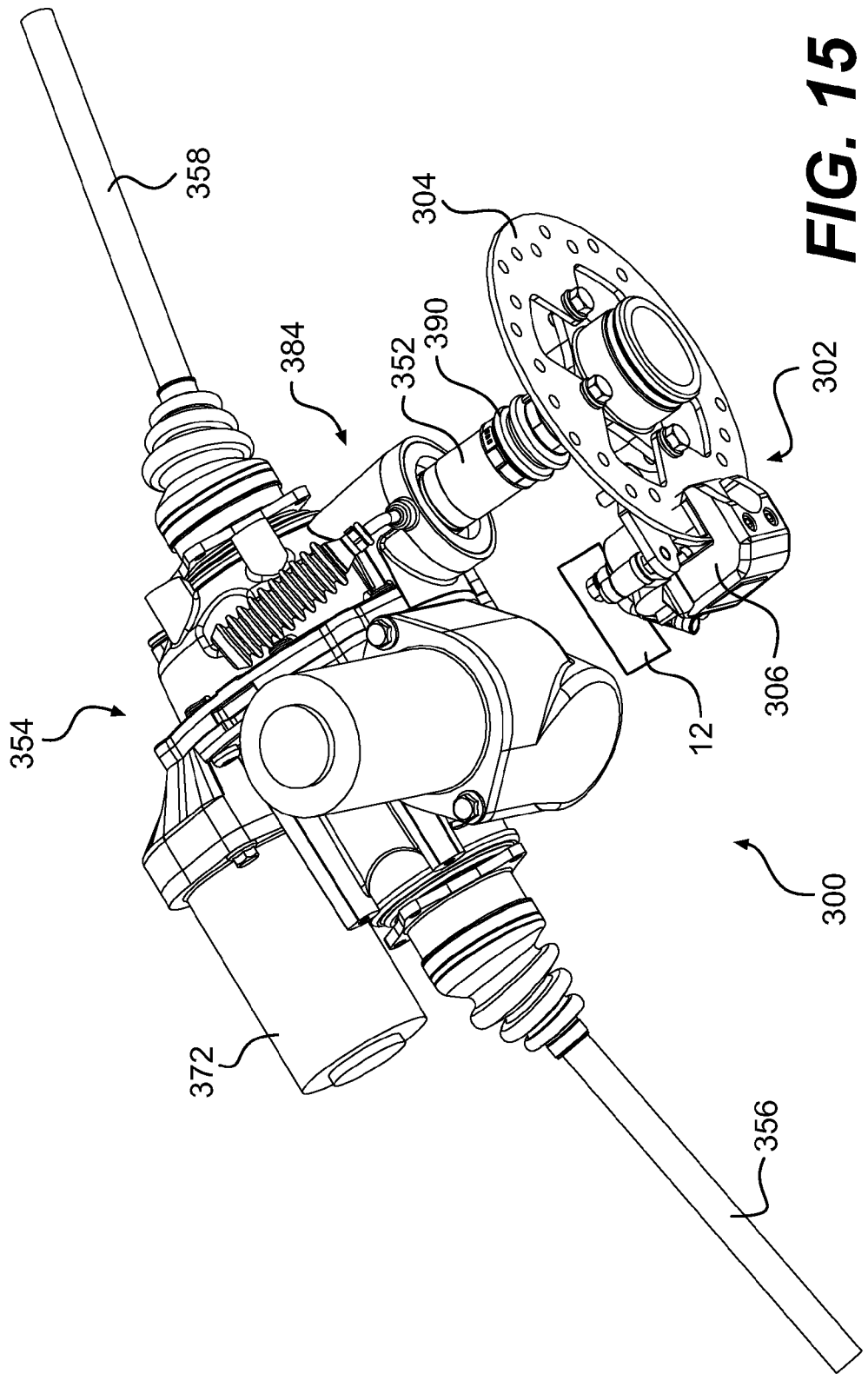
FIG. 15 is a perspective view, taken from a rear, left side, of a braking system according to a third embodiment.
Figure 16:
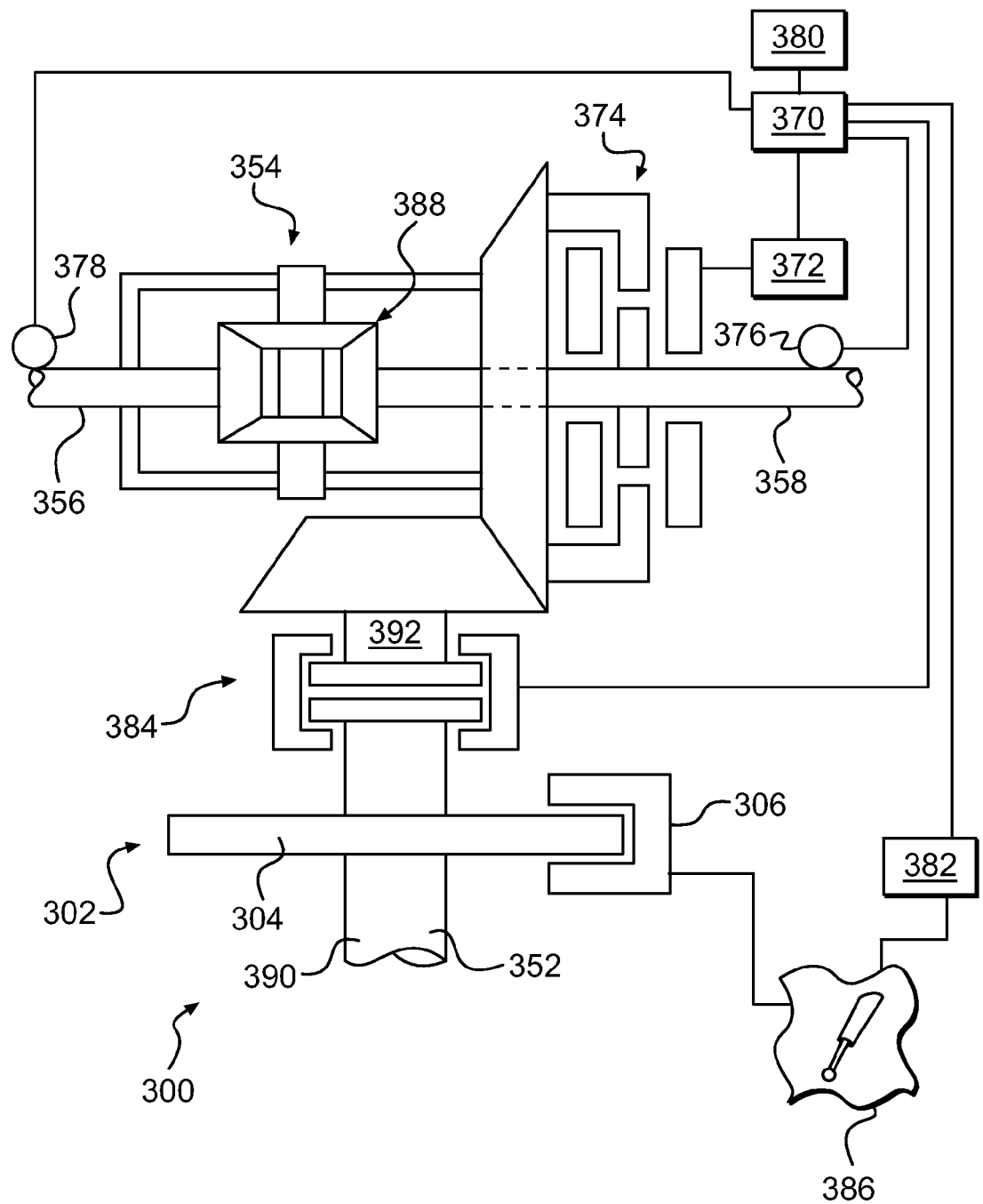
FIG. 16 is a schematic cross-sectional view of the braking system of FIG. 15.

FIGS. 15 and 16 show a braking system 300 for the front wheels 14 according to a third embodiment. The braking system is similar to the braking system 200 of FIGS. 13 and 14, but with the addition of an electronically actuated slip clutch 384 on the front drive shaft 352 and operatively disposed between a first portion 390 of the drive shaft 352, on which the brake 302 is disposed, and a second portion 392 of the drive shaft 352 that is connected to the LSD 354. In this arrangement, the brake caliper 306 is mounted to the frame 12 directly and not via the housing of the LSD 354. The slip clutch 384 may be any suitable clutch that is designed to transmit torque below a threshold level of torque and slip when a torque greater than the threshold is applied. The slip clutch 384 is preferably an electronically controlled slip clutch, in which case the threshold level of torque is variable and controllable by the control unit 370. The slip clutch 384 is normally fully engaged during the operation of the ATV 10, to completely transfer both the torque output of the engine and the braking torque of the brake 302 to the front wheels 14 via the front drive shaft 352. The slip clutch 384 may be partially disengaged during certain braking conditions to modulate the total braking torque applied to the front wheels 14 by the brake 302, as will be described in detail below. The operation of the braking system 300 to brake the ATV 10 will be described in detail below.

Figure 17:
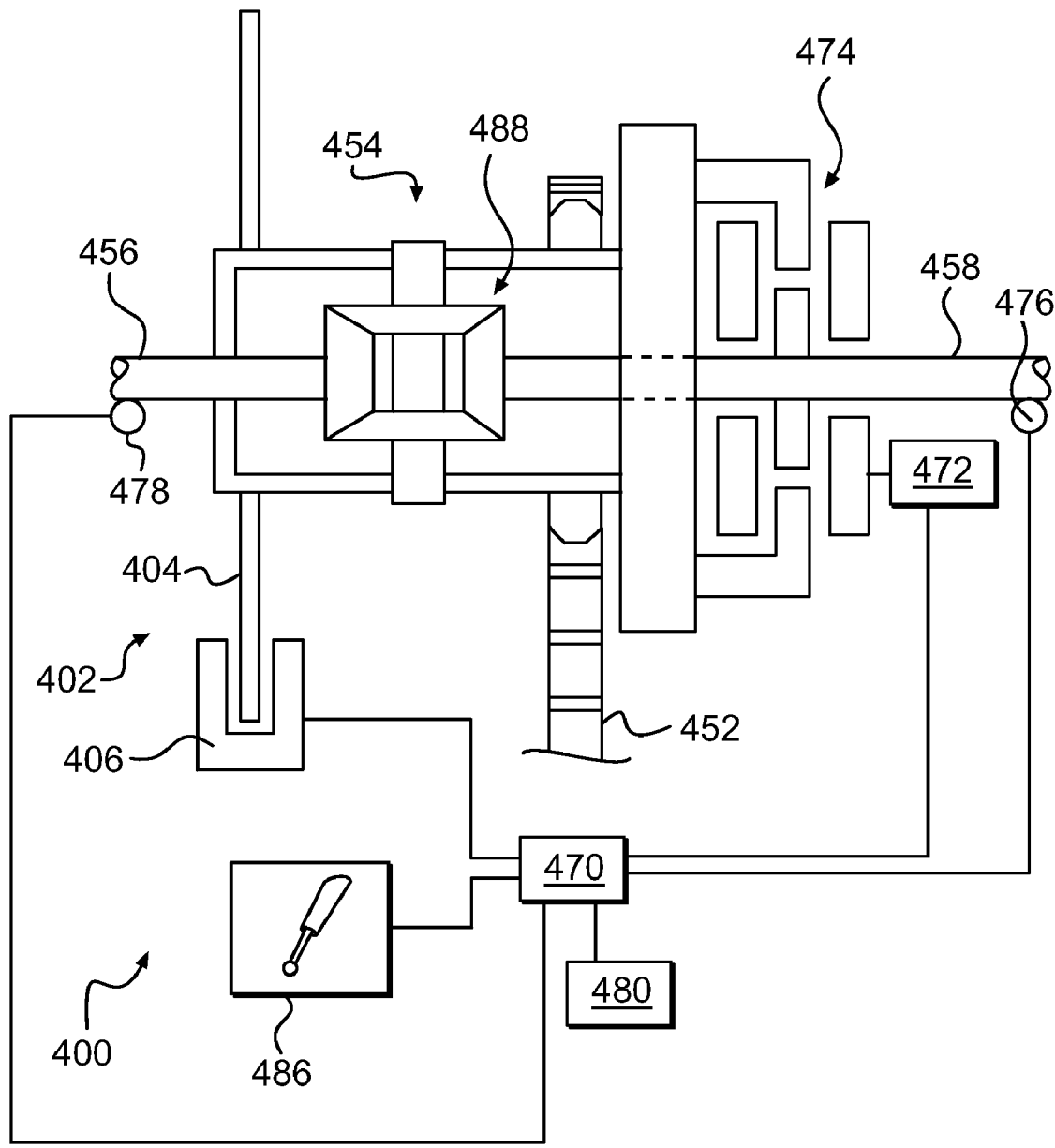
FIG. 17 is a schematic cross-sectional view of a braking system according to a fourth embodiment.

FIG. 17 shows a braking system 400 for the front wheels 14 according to a fourth embodiment. In this embodiment, the brake disk 404 is mounted on the housing 486 of the LSD 454. This arrangement allows for the LSD 454 to be driven by a belt or chain 452 operatively connected to the output 32 of the engine. The brake 402 is operatively disposed between the belt or chain 452 and the gears 488 of the LSD 454, and as such the application of the brake 402 exerts a braking torque on both front wheels 14 via the LSD 454. Each of the brake 402 and the clutch 474 may be mechanical as described with respect to the embodiment of FIGS. 11 and 12, or controlled by the control unit 470. The operation of the braking system 400 to brake the ATV 10 will be described in detail below.

Figure 18:
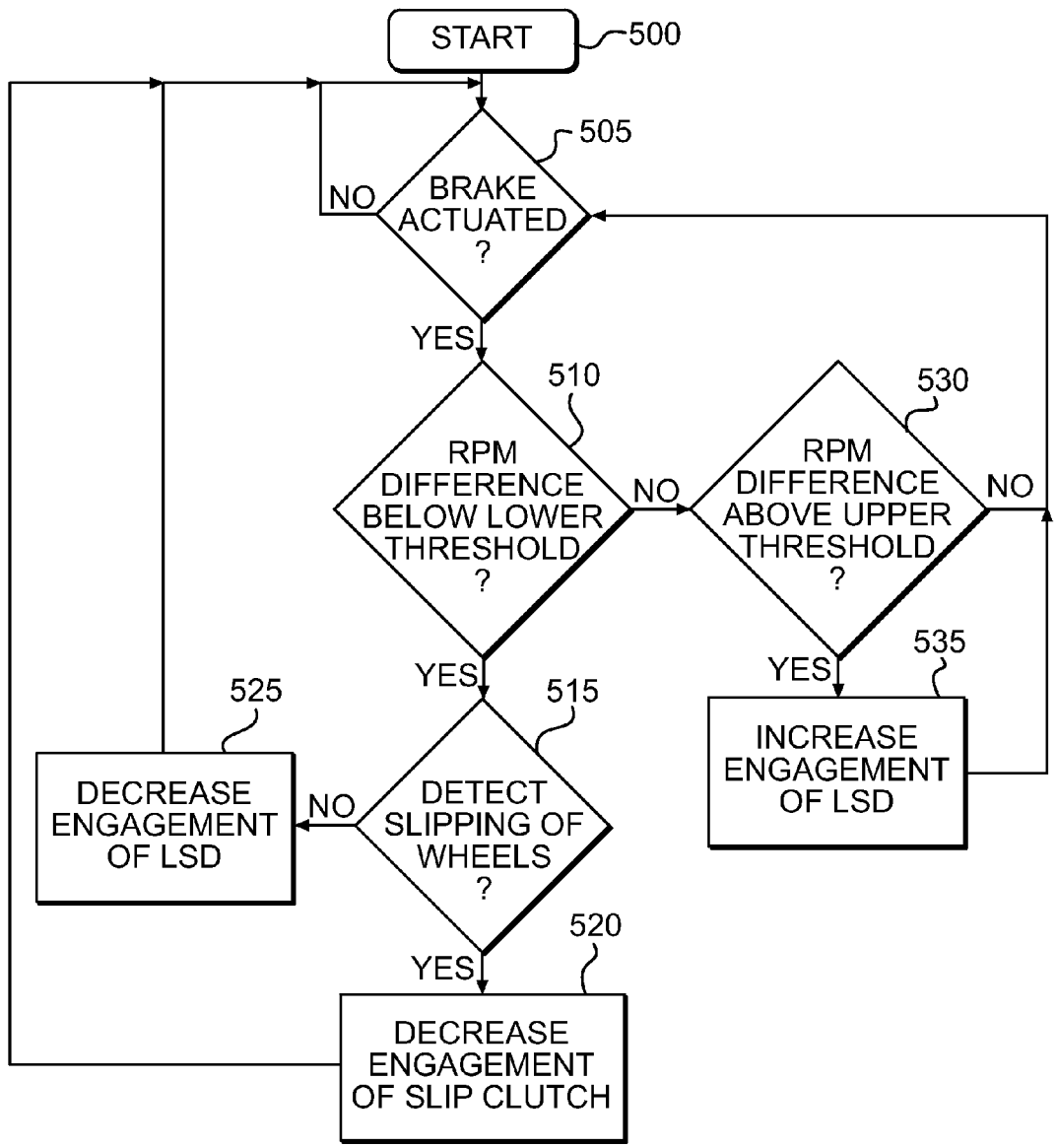
FIG. 18 is a logic diagram showing the operation of a braking system according to an embodiment of the present invention.

FIG. 18 shows a logic diagram of the operation of a braking system according to an embodiment of the present invention. The operation will be described first with reference to the braking system 100 having a mechanical LSD 54, and then with respect to the braking system 300 having an electronically controlled LSD 354. It should be understood that the braking systems 200 and 400 operate similarly, and their operation will not be separately described.

The operation of the braking system 100 will now be described, beginning at step 500.

At step 505, a determination is made as to whether the brake 102 is actuated. If the brake 102 is actuated, the system proceeds to step 510. If the brake 102 is not actuated, the system returns to step 505 and the LSD 54 preferably acts in a conventional manner until the brake actuator 186 is actuated. It is contemplated that step 505 may be performed implicitly by configuring the LSD 54 such that step 510 is performed at least whenever the brake 102 is actuated, for example the LSD 54 could be configured to always perform step 510 irrespective of whether the brake 102 is actuated.

At step 510, the LSD 54 determines whether the difference in rotational speed between the left and right front wheels 14 is below a lower threshold speed. The lower threshold speed may be small, for example below 1 RPM, in which case a difference in rotational speed below the lower threshold would indicate that either the front wheels 14 are achieving a similar amount of traction irrespective of the degree of engagement of the LSD 54, or the LSD 54 is effectively in a fully engaged or locked state. In the former case, the degree of engagement of the LSD 54 is immaterial to braking performance. In the latter case, it may be possible to improve braking performance by decreasing the degree of engagement of the LSD 54. In either of these cases, it is unlikely that an improvement in braking performance can be obtained by an increase in the degree of engagement of the LSD 54. This step may be performed implicitly by the conventional operation of the LSD 54, in that the LSD 54 will not generate an increased degree of engagement in the absence of a sufficient difference in rotational speed between the two front wheels 14. If the difference in rotational speed is below the lower threshold, the process continues at step 515. If the difference in speed is not below the lower threshold, the process continues at step 530.

At step 515, the LSD 54 determines whether the front wheels 14 have traction with respect to the terrain on which the ATV 10 is travelling. If both of the front wheels 14 have traction with respect to the terrain, this indicates that both front wheels 14 can be used to generate a braking force. Improved braking performance can potentially be obtained by allowing the front wheels 14 to rotate at different speeds, thereby allowing the LSD 54 to distribute the braking torque to the front wheels 14 according to the maximum traction available at each wheel. One indication that the wheels are slipping may be that both front wheels 14 are turning at a slow speed or not turning at all. If one or both front wheels 14 are slipping and a slip clutch is present, the process continues at step 520. If one or both front wheels 14 are slipping and no slip clutch is present, the process returns to step 505. If both front wheels 14 have traction, the process continues at step 525. It should be understood that in the absence of a slip clutch, this configuration generates the same braking force as a conventional solid axle when the lower threshold at step 510 is sufficiently low that the LSD 54 is effectively locked.

At step 520, the degree of engagement of the slip clutch is decreased in response to the slipping of the front wheels 14 detected at step 515. The slipping is caused by the brake 102 generating so much braking torque that the tires cannot maintain static friction with respect to the terrain, no matter how the torque is allocated between the front wheels 14 by the LSD 54. The decrease in engagement of the slip clutch reduces the amount of braking torque transferred from the brake 102 to the LSD 54. As a result, the LSD 54 has less braking torque to allocate between the two front wheels 14, potentially allowing the LSD 54 to allocate to each front wheel 14 the proper amount of torque to brake without slipping on the terrain. The process returns to step 505. If no slip clutch is provided on the front drive shaft, step 520 is omitted and the process returns from step 515 to step 505. In this configuration, the braking performance of the ATV 10 cannot be further improved by the LSD 54 under the current braking conditions.

At step 525, in response to a determination at step 515 that both front wheels 14 have traction with respect to the terrain, the degree of engagement of the LSD 54 is decreased. It is contemplated that this may be a result of the conventional operation of the LSD 54, due to the torque applied to each front wheel 14 by the terrain. As a result, the front wheels 14 are permitted to rotate at different speeds, so that an increased amount of braking torque can be applied to each front wheel 14 without causing the front wheels 14 to slip, thereby producing increased traction and improved braking and steering performance relative to a conventional locked differential or a solid axle. The process returns to step 505.

At step 530, in response to the difference in rotational speeds of the front wheels 14 being greater than the lower threshold (step 510), the difference in rotational speeds is compared to an upper threshold. The upper threshold corresponds to the maximum difference in rotational speeds permitted by the configuration of the LSD 54. As such, the comparison may be performed implicitly by the LSD 54 increasing its degree of engagement as the difference in rotational speeds increases. The upper threshold may be adjusted by calibrating the biasing force acting on the clutch 174, or by otherwise calibrating the LSD 54 if a different type of LSD 54 is used, as should be understood by persons skilled in the art. The upper threshold is preferably between 7 and 9 RPM, but may be higher or lower depending on the ride qualities desired. Increasing the upper threshold generally provides easier turning on solid and uniform terrain such as concrete or paved roads, whereas decreasing the upper threshold generally provides better braking performance on irregular or non-uniform terrain in which different wheels of the vehicle may experience different levels of traction. If the difference in rotational speeds is greater than the upper threshold, indicating that one front wheel 14 is slipping, the process continues at step 535. If the difference in rotational speeds is less than the upper threshold, indicating that both wheels have traction, the process returns to step 505. A difference in rotational speeds between the lower threshold and the upper threshold indicates that both front wheels 14 are rolling without slipping at different rotational speeds, corresponding to a desired braking situation. It should be understood that this situation provides improved braking performance compared to a conventional ATV with a locked differential, in which either one front wheel 14 would slip with respect to the terrain, or one front wheel 14 would provide less than its maximum braking force, due to the different maximum amount of friction available between each front wheel 14 and its terrain.

At step 535, in response to an RPM difference above the upper threshold, the degree of engagement of the LSD 54 is increased. The purpose of increasing the degree of engagement is to transfer additional braking torque to the wheel that is not slipping, to improve the braking performance of the ATV 10. The process then returns to step 505.

Referring again to FIG. 18, the operation of the braking system 300 will now be described, beginning at step 500.

At step 505, the control unit 370 determines whether the brake 302 is actuated, based on a signal received from the brake sensor 382. The control unit 370 may also determine the degree to which the brake 302 is actuated, which is indicative of a rate of deceleration desired by the driver. If the brake 302 is actuated, the process continues from step 505 to step 510. If the brake 302 is not actuated, the process returns to step 505 and the LSD 354 preferably acts as a conventional LSD while the control unit 370 awaits a further signal.

At step 510, the control unit 370 receives signals from the wheel speed sensors 276, 278 indicative of a difference in rotational speed between the left and right front wheels 14. It is contemplated that the control unit 370 may receive either separate signals from each wheel speed sensor 276, 278 indicative of the rotational speed of each front wheel 14, or a single signal indicative of the difference between the respective rotational speeds. The control unit 370 determines whether the difference in rotational speeds is below a lower threshold speed. The lower threshold speed may be small, for example below 1 RPM, in which case a difference below the lower threshold would indicate that either the front wheels 14 are achieving a similar amount of traction irrespective of the degree of engagement of the LSD 354, or the LSD 354 is effectively in a fully engaged or locked state. In the former case, the degree of engagement of the LSD 354 is immaterial to braking performance. In the latter case, it may be possible to improve braking performance by decreasing the degree of engagement of the LSD 354. In either of these cases, it is unlikely that improvement in braking performance can be obtained by an increase in the degree of engagement of the LSD 354, and the process continues at step 515. If the difference is not below the lower threshold, the process proceeds to step 530.

At step 515, the control unit 370 determines whether both of the front wheels 14 are slipping with respect to the terrain on which the ATV 10 is travelling. If both of the front wheels 14 have traction with respect to the terrain, this indicates that both front wheels 14 can be used to generate a braking force. Improved braking performance can potentially be obtained by allowing the front wheels 14 to rotate at different speeds, thereby allowing the LSD 354 to distribute the braking torque to the front wheels 14 according to the maximum traction available at each wheel. The determination of whether the front wheels 14 are slipping may be made based on any suitable signal or signals received from one or more sensors of the ATV 10. One indication that both wheels are slipping may be that both front wheels 14 are turning at a slow speed or not turning at all. One indication that one of the front wheels 14 has traction may be a greater force exerted by the terrain on the non-slipping front wheel 14, tending to make the front wheels 14 rotate at different speeds. For example, the control unit 370 may compare the current rotational speed of either or both of the front wheels 14 to a reference speed. The reference speed may be the rotational speed of one or both of the rear wheels 14, or the rotational speed of the shaft 52. The reference speed may alternatively be the current speed of the ATV 10 as determined by any suitable means independent of the current speed of the front wheels 14, such as a GPS system (not shown). The reference speed may alternatively be an expected rotational speed of the front wheels 14 calculated based on the speed of either the vehicle or the front wheels prior to braking and the duration of application of the braking torque. This calculation may make use of the degree of actuation of the brake 302 determined at step 505, summed over the duration of application of the braking torque. In any of these cases, a speed of the front wheels 14 lower than the reference speed would be indicative of the wheels slipping with respect to the terrain. It should be understood that in the absence of a slip clutch, this configuration generates the same braking force as a conventional solid axle when the lower threshold at step 510 is sufficiently low that the LSD 354 is effectively locked.

At step 520, the degree of engagement of the slip clutch is decreased in response to the slipping of the front wheels 14 detected at step 515. The slipping is caused by the brake 302 generating so much braking torque that the tires cannot maintain static friction with respect to the terrain, no matter how the torque is allocated between the front wheels 14 by the LSD 354. The decrease in engagement of the slip clutch reduces the amount of braking torque transferred from the brake 302 to the LSD 354. As a result, the LSD 354 has less torque to allocate between the two front wheels 14, potentially allowing both front wheels 14 to brake without slipping on the terrain. The process returns to step 505. If no slip clutch is provided on the front drive shaft, step 520 is omitted and the process returns to step 505. In this configuration, the braking performance of the ATV 10 cannot be further improved by the LSD 354.

At step 525, in response to an indication that at least one front wheel 14 is not slipping with respect to the terrain, the degree of engagement of the LSD 354 is decreased. As a result, the front wheels 14 are permitted to rotate at different speeds, so that both front wheels 14 might possibly be able to roll without slipping at different speeds, thereby producing increased traction and improved braking and steering performance relative to a conventional locked differential or a solid axle. The process returns to step 505.

At step 530, in response to the difference in rotational speeds of the front wheels 14 being greater than the lower threshold (step 510), the difference in rotational speeds is compared to an upper threshold. The upper threshold corresponds to the maximum difference in rotational speeds permitted by the configuration of the LSD 354. As such, the comparison may be performed implicitly by the LSD 354 increasing its degree of engagement as the difference in rotational speeds increases. The upper threshold may be adjusted by calibrating the biasing force acting on the clutch 374, or by otherwise calibrating the LSD 354 if a different type of LSD 354 is used, as should be understood by persons skilled in the art. The upper threshold is preferably between 7 and 9 RPM, but may be higher or lower depending on the ride qualities desired. Increasing the upper threshold generally provides easier turning on solid and uniform terrain such as concrete or paved roads, whereas decreasing the upper threshold generally provides better braking performance on irregular or non-uniform terrain in which different wheels of the vehicle may experience different levels of traction. If the difference in rotational speeds is greater than the upper threshold, indicating that one front wheel 14 is slipping, the process continues at step 535. If the difference in rotational speeds is less than the upper threshold, indicating that both wheels have traction, the process returns to step 505. A difference in rotational speeds between the lower threshold and the upper threshold indicates that both front wheels 14 are rolling without slipping at different rotational speeds, corresponding to a desired braking situation. It should be understood that this situation provides improved braking performance compared to a conventional ATV with a locked differential, in which either one front wheel 14 would slip with respect to the terrain, or one front wheel 14 would provide less than its maximum braking force, due to the different maximum amount of friction available between each front wheel 14 and its terrain.

At step 535, in response to an RPM difference above the upper threshold, the degree of engagement of the LSD 354 is increased. The purpose of increasing the degree of engagement is to transfer additional torque to the wheel that is not slipping, to improve the braking performance of the ATV 10. The process then returns to step 505.

It should be understood that the above apparatus and method provide improved braking performance and steering compared to a conventional locked differential under at least some conditions, while also providing an ATV 10 having increased mass centralization, reduced weight and reduced unsprung weight.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a frame;
   a seat disposed on the frame for supporting one or more riders;
   an engine supported by the frame;
   a plurality of wheels supported by the frame, at least one of the plurality of wheels being operatively connected to the engine for propelling the vehicle;
   a steering device disposed generally forwardly of the seat and operatively connected to at least one of the plurality of wheels for steering the vehicle;
   a limited slip differential supported by the frame;
   a first half-shaft and a second half-shaft operatively connected to the limited slip differential,
     the first half-shaft supporting a first wheel of the plurality of wheels; and
     the second half-shaft supporting a second wheel of the plurality of wheels;
   a shaft operatively connected to the limited slip differential for providing an output torque of the engine to the limited slip differential;
   a brake operatively connected to the limited slip differential via the shaft, the brake selectively exerting a braking torque on the first and second wheels via at least one portion of the limited slip differential to reduce the speed of the vehicle, the brake comprising:
     a brake disk mounted on and rotating with the shaft; and
     a brake caliper supported by the frame and operative to selectively frictionally engage the brake disk to exert the braking torque; and
   a control unit electrically connected to the limited slip differential;
   wherein when the brake is actuated, the control unit is operative to selectively increase a degree of engagement of the limited slip differential in response to a difference between rotational speeds of the first and second wheels being greater than a first predetermined difference.

2. The vehicle of claim 1, wherein at least one portion of the brake is mounted on the at least one portion of the limited slip differential.

3. The vehicle of claim 1, wherein selectively increasing the degree of engagement of the limited slip differential includes causing an actuator to increase a degree of engagement of a clutch of the limited slip differential, the clutch being disposed operatively between the at least one portion of the limited slip differential and one of the first and second half-shafts.

4. The vehicle of claim 1, wherein the first predetermined difference is between 7 and 9 RPM.

5. The vehicle of claim 1, wherein:
   the shaft has a first portion and a second portion;
   at least one portion of the brake is mounted on the first portion of the shaft; and
   the second portion of the shaft is connected to the limited slip differential;
   further comprising a slip clutch operatively connecting the first portion of the shaft to the second portion of the shaft, such that the slip clutch is operatively disposed between the brake and the at least one portion of the limited slip differential.

6. The vehicle of claim 5, wherein:
   the control unit is electrically connected to the slip clutch; and
   when the brake is actuated, the control unit is operative to selectively decrease a degree of engagement of the slip clutch in response to at least one of the first and second wheels slipping with respect to terrain and the difference between the rotational speeds of the first and second wheels being less than a second predetermined difference,
   the second predetermined difference being less than the first predetermined.

7. The vehicle of claim 6, wherein the second predetermined difference is less than 1 RPM.

8. The vehicle of claim 5, wherein:
   when the brake is actuated, the control unit is operative to selectively decrease a degree of engagement of the slip clutch in response to the rotational speeds of the first and second wheels being less than a predetermined threshold rotational speed and the difference between the rotational speeds of the first and second wheels being less than a second predetermined difference,
   the second predetermined difference being less than the first predetermined difference.

9. A vehicle comprising:
   a frame;
   a seat disposed on the frame for supporting one or more riders;
   an engine supported by the frame;
   a plurality of wheels supported by the frame, at least one of the plurality of wheels being operatively connected to the engine for propelling the vehicle;
   a steering device disposed generally forwardly of the seat and operatively connected to at least one of the plurality of wheels for steering the vehicle;
   a limited slip differential supported by the frame;
   a first half-shaft and a second half-shaft operatively connected to the limited slip differential,
     the first half-shaft supporting a first wheel of the plurality of wheels; and
     the second half-shaft supporting a second wheel of the plurality of wheels;
   a shaft operatively connected to the limited slip differential for providing an output torque of the engine to the limited slip differential; and
   a brake operatively connected to the limited slip differential via the shaft, the brake selectively exerting a braking torque on the first and second wheels via at least one portion of the limited slip differential to reduce the speed of the vehicle, the brake comprising:
     a brake disk mounted on and rotating with the shaft; and
     a brake caliper supported by the frame and operative to selectively frictionally engage the brake disk to exert the braking torque,
   the shaft having a first portion and a second portion, at least one portion of the brake being mounted on the first portion of the shaft, and the second portion of the shaft is connected to the limited slip differential; and
   a slip clutch operatively connecting the first portion of the shaft to the second portion of the shaft, such that the slip clutch is operatively disposed between the brake and the at least one portion of the limited slip differential.

10. The vehicle of claim 9, wherein at least one portion of the brake is mounted on the at least one portion of the limited slip differential.

* * * * *